United States Patent
Lee et al.

(10) Patent No.: US 10,658,897 B2
(45) Date of Patent: May 19, 2020

(54) STATOR FOR ROTARY ELECTRIC MACHINE

(71) Applicant: LG Electronics Inc., Seoul (KR)

(72) Inventors: Hyounggun Lee, Seoul (KR); Minjung Kim, Seoul (KR); Yangsoo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 308 days.

(21) Appl. No.: 15/680,459

(22) Filed: Aug. 18, 2017

(65) Prior Publication Data
US 2018/0309337 A1    Oct. 25, 2018

(30) Foreign Application Priority Data

Apr. 19, 2017  (KR) .................. 10-2017-0050631

(51) Int. Cl.
*H02K 3/28* (2006.01)
*H02K 3/50* (2006.01)
*H02K 3/12* (2006.01)
*H02K 3/16* (2006.01)
*H02K 3/32* (2006.01)

(52) U.S. Cl.
CPC ................. *H02K 3/28* (2013.01); *H02K 3/12* (2013.01); *H02K 3/50* (2013.01); *H02K 2203/09* (2013.01)

(58) Field of Classification Search
CPC .. H02K 3/12; H02K 3/28; H02K 3/50; H02K 2203/09
See application file for complete search history.

(56) References Cited

U.S. PATENT DOCUMENTS

| 9,899,888 B2 * | 2/2018 | Shibata ................... H02K 3/12 |
| 2009/0267441 A1 | 10/2009 | Hiramatsu et al. |
| 2012/0200191 A1 * | 8/2012 | Baba ....................... H02K 3/12 |
| | | 310/201 |
| 2012/0235534 A1 * | 9/2012 | Chamberlin ........... H02K 3/345 |
| | | 310/215 |
| 2017/0033630 A1 * | 2/2017 | Tamura ................... H02K 3/12 |
| 2017/0256996 A1 * | 9/2017 | Nakamura ............... H02K 1/16 |
| 2019/0044403 A1 * | 2/2019 | Kano ....................... H02K 3/38 |

FOREIGN PATENT DOCUMENTS

| JP | 2002-330572 | 11/2002 |
| JP | 2016-025765 | 2/2016 |
| JP | 2016-152750 | 8/2016 |
| KR | 10-2011-0075837 | 7/2011 |

* cited by examiner

*Primary Examiner* — Jue Zhang
*Assistant Examiner* — Bart Iliya
(74) *Attorney, Agent, or Firm* — Fish & Richardson P.C.

(57) ABSTRACT

A stator for a rotary electric machine includes a stator core defining multiple slots, and a stator coil including multiple phase windings each of which is connected to a corresponding phase of a power source. Each phase winding includes multiple conductors that are inserted into the slots, connected to adjacent conductors in series, and spaced apart from the adjacent conductors by multiple slot pitches, unit patterns each of which includes some of conductors, and a bridge conductor connecting the unit patterns to each other in series by connecting a pair of conductors arranged in an innermost layer of corresponding slots. Each first conductor of each phase winding is connected to a power line and arranged in an outermost layer of one of the multiple slots.

20 Claims, 17 Drawing Sheets

STATOR FOR ROTARY ELECTRIC MACHINE

CROSS-REFERENCE TO RELATED APPLICATION

Pursuant to 35 U.S.C. § 119(a), this application claims the benefit of an earlier filing date of and the right of priority to Korean Application No. 10-2017-0050631, filed on Apr. 19, 2017, the contents of which are incorporated by reference herein in its entirety.

FIELD

The present disclosure relates to a stator for a rotary electric machine.

BACKGROUND

An electric machine may include a stator and a rotor arranged to be rotatable with respect to the stator. The stator may include a stator core having a plurality of slots and a stator coil that is wound on the stator core. The rotor may be configured to be rotated by an electromagnetic force with the stator or by an external driving force.

A part of the stator coil may be conductors formed as copper wires in order to increase a space factor with respect to the slots. The stator coil may be formed by connecting a plurality of conductors inserted into the plurality of slots to each other in a specific pattern.

A conventional stator for a rotary electric machine may have the following problems. In some cases, based on a connection pattern of the conductors of the stator core, connection parts of the conductors are spaced apart from each other by a relatively long distance in a circumferential direction of the stator core. Accordingly, a connection ring formed to connect the conductors with each other is used. This may cause the number of components to be increased, and the fabrication costs to be increased.

In some cases, based on a connection pattern of the conductors of the stator core, the connection parts of the conductors are arranged in a middle layer of a corresponding slot. This may cause a difficulty in connecting the conductors (jump lines) with each other.

In some cases, based on a connection pattern of the conductors of the stator core, the conductors are protruded toward outside of the stator in a radial direction of the stator, in order to avoid interference between the conductors. Accordingly, a case for accommodating the stator therein may be provided with an accommodation portion protruded in a radial direction of the stator core. This may cause a difficulty in fabricating and installing the case.

SUMMARY

One aspect of subject matter described in this application is to provide a stator for a rotary electric machine that can simplify types of conductors and reduce the number of welding regions.

Another aspect is to provide a stator for a rotary electric machine without a connection ring.

Another aspect is to provide a stator for a rotary electric machine that can easily connect conductors (jump lines) of a stator coil with each other.

Another aspect is to provide a stator for a rotary electric machine that can restrict a usage of conductors (jump lines) when layers are connected to each other.

According to one aspect of the subject matter described in this application, a stator for a rotary electric machine includes a stator core defining a plurality of slots and a stator coil including a plurality of phase windings each of which is connected to a corresponding phase of a power source. Each of the plurality of phase windings includes a plurality of conductors numbered from 1st to Nth conductors and inserted into the plurality of slots in which each of the plurality of conductors is connected to an adjacent conductor in series and spaced apart from the adjacent conductor by a first pitch spanning a portion of the plurality of slots, a plurality of unit patterns each of which comprises a portion of the plurality of conductors, and a bridge conductor that connects the plurality of unit patterns to each other in series by connecting a pair of conductors among the plurality of conductors in which the pair of conductors is arranged in an innermost layer of corresponding slots. Each 1st conductor of the plurality of conductors of each phase winding is connected to a power line and arranged in an outermost layer of one of the plurality of slots.

Implementations according to this aspect may include one or more of following features. For example, each Nth conductor may be connected to a neutral line, arranged in the outermost layer, and spaced apart from the 1st conductor by the first pitch. The plurality of unit patterns may include a first unit pattern including a first portion of the plurality of conductors that includes the 1st conductor in which each conductor of the first portion is connected to an adjacent conductor among the first portion and spaced apart from the adjacent conductor by the first pitch in a first direction along a circumferential direction of the stator core, and a second unit pattern including a second portion of the plurality of conductors that includes the Nth conductor in which each conductor of the second portion being connected to an adjacent conductor among the second portion and spaced apart from the adjacent conductor by the first pitch in a second direction opposite the first direction. The bridge conductor may connect a last conductor of the first unit pattern and a first conductor of the second unit pattern that are arranged in the innermost layer and spaced apart by the first pitch.

In some implementations, the first unit pattern may include m−1 conductors that are connected in series in the first direction and numbered from the 1st conductor to an (m−1)th conductor in which odd-numbered conductors of the first unit pattern may be arranged at layers that are located outer by one layer than an adjacent even-numbered conductor of the first unit pattern. The second unit pattern may include N−(m−1) conductors that are connected in series in the second direction and numbered from an mth conductor to the Nth conductor in which even-numbered conductors of the second unit pattern are arranged at layers located outer by one layer than adjacent odd-numbered conductors of the second unit pattern.

In some implementations, the stator core may include sheets of metal laminated in a lamination direction where the 1st conductor protrudes in the lamination direction of the stator core. Each of the plurality of phase windings may include a first partial phase winding and a second partial phase winding that are connected to each other in parallel. The plurality of phase windings may include a first phase winding, a second phase winding, and a third phase winding. The second phase winding may be spaced apart from the first phase winding in the first direction by a second pitch less than the first pitch, and the third phase winding may be spaced apart from the second phase winding by the second pitch in the first direction.

In some implementations, the neutral line may include three conductor contact portions that are connected to the Nth conductor of the first, second, and third phase windings, respectively, and two crossover portions that connect adjacent conductor contact portions of the three conductor contact portions. The conductor contact portions may contact an outer surface of the Nth conductors where the conductor contact portions and the Nth conductors may be welded to each other in a radial direction of the stator core. The crossover portions may protrude outward from the conductor contact portions in the radial direction of the stator core, and the conductor contact portions and the crossover portions are arranged at an inner side of an outer periphery of the stator core.

In some implementations, the bridge conductor may include conductor contact portions that contact the (m−1)th conductor and the mth conductor, respectively, horizontal bent portions extending from the conductor contact portions in a first curved direction, vertical bent portions extending from the horizontal bent portions in a second curved direction, and a crossover portion that connects the vertical bent portions to each other. The (m−1)th conductor and the mth conductor may protrude in an axial direction of the stator core farther than end parts of other conductors of the first and second unit patterns, and each of the horizontal bent portions may be spaced apart from a welding portion located at end parts of the other conductors by a preset interval.

For example, the plurality of slots may include 48 slots numbered from 1st to 48th slots, each of the 48 slots may include 8 layers from 1st to 8th layers, the first pitch may span 6 consecutive slots of the plurality of slots, and the second pitch may span 4 consecutive slots of the plurality of slots. In this example, the first unit pattern of the first phase winding may include first 32 conductors connected in series from 1st to 32nd conductors in the first direction. The first 32 conductors may be arranged in a manner in which the 1st conductor of the first unit pattern is provided in the 8th layer of the 1st slot, the 2nd conductor of the first unit pattern is provided in the 7th layer of the 7th slot, and the 3rd conductor is provided in the 8th layer of the 13th slot, and the 32nd conductor is provided in the 1st layer of the 43rd slot. Similarly, the second unit pattern of the first phase winding may include second 32 conductors connected in series from 33rd to 64th conductors in the second direction. The second 32 conductors may be arranged in a manner in which the 33rd conductor the second unit pattern is provided in the 1st layer of the 1st slot, the 34th conductor is arranged in the 2nd layer of the 43rd slot, and the 64th conductor is provided in the 8th layer of the 7th slot. The bridge conductor may connect the 32nd conductor and the 33rd conductor.

In some implementations, each of the plurality of conductors is a 2-line integrated type conductor that includes a pair of conductor segments, and the pair of conductor segments have a same shape and size and are fold to overlap each other. In some examples, the stator may further include a plurality of insulation members that are inserted into the plurality of slots and that insulate the stator core from the plurality of conductors. In some examples, each of the plurality of conductors may include a conductor segment. The conductor segment may include a first insertion portion extending in an axial direction of the stator core and being configured to insert into a first slot of the plurality of slots, a second insertion portion extending in the axial direction and being configured to insert into a second slot spaced apart from the first slot by the first pitch, and a pair of crossover portions that extend from first ends of the first and second insertion portions and that are connected to each other.

In some implementations, the conductor segment may further include a bent portion that connects the pair of crossover portions and that is bent in a thickness direction of the conductor segment to allow the first and second insertion portions to insert into different layers arranged in a radial direction of the stator core in different slots. The conductor segment may further include a pair of extension portions that extend from second ends of the first and second insertion portions, and each of the pair of extension portions is bent toward a first direction along a circumferential direction of the stator core or a second direction opposite the first direction.

In some implementations, the conductor segment may include an insulation layer that insulates the plurality of conductors from each other. The pair of extension portions may include bent end parts that extend in the axial direction and that have a cut-out portion without the insulation layer. The conductor segment may be configured to be electrically connected to another conductor segment through the cut-out portion.

Further scope of applicability of the present application will become more apparent from the detailed description given hereinafter. However, it should be understood that the detailed description and specific examples, while indicating preferred implementations of the disclosure, are given by way of illustration only, since various changes and modifications within the spirit and scope of the disclosure will become apparent to those skilled in the art from the detailed description.

DETAILED DESCRIPTION

Hereinafter, implementations of the present disclosure will be explained in more detail with reference to the attached drawings. In this specification, the same or equivalent components will be provided with the same reference numbers, and description thereof will not be repeated. A singular expression includes a plural concept unless there is a contextually distinctive difference therebetween. If it is regarded that detailed descriptions of the related art are not within the range of the present disclosure, the detailed descriptions will be omitted. Furthermore, it should also be understood that the attached drawings are merely exemplary for easy understanding of implementations of the present disclosure, and thus the implementations are not limited to any of the details of the attached drawings.

Figure 1:
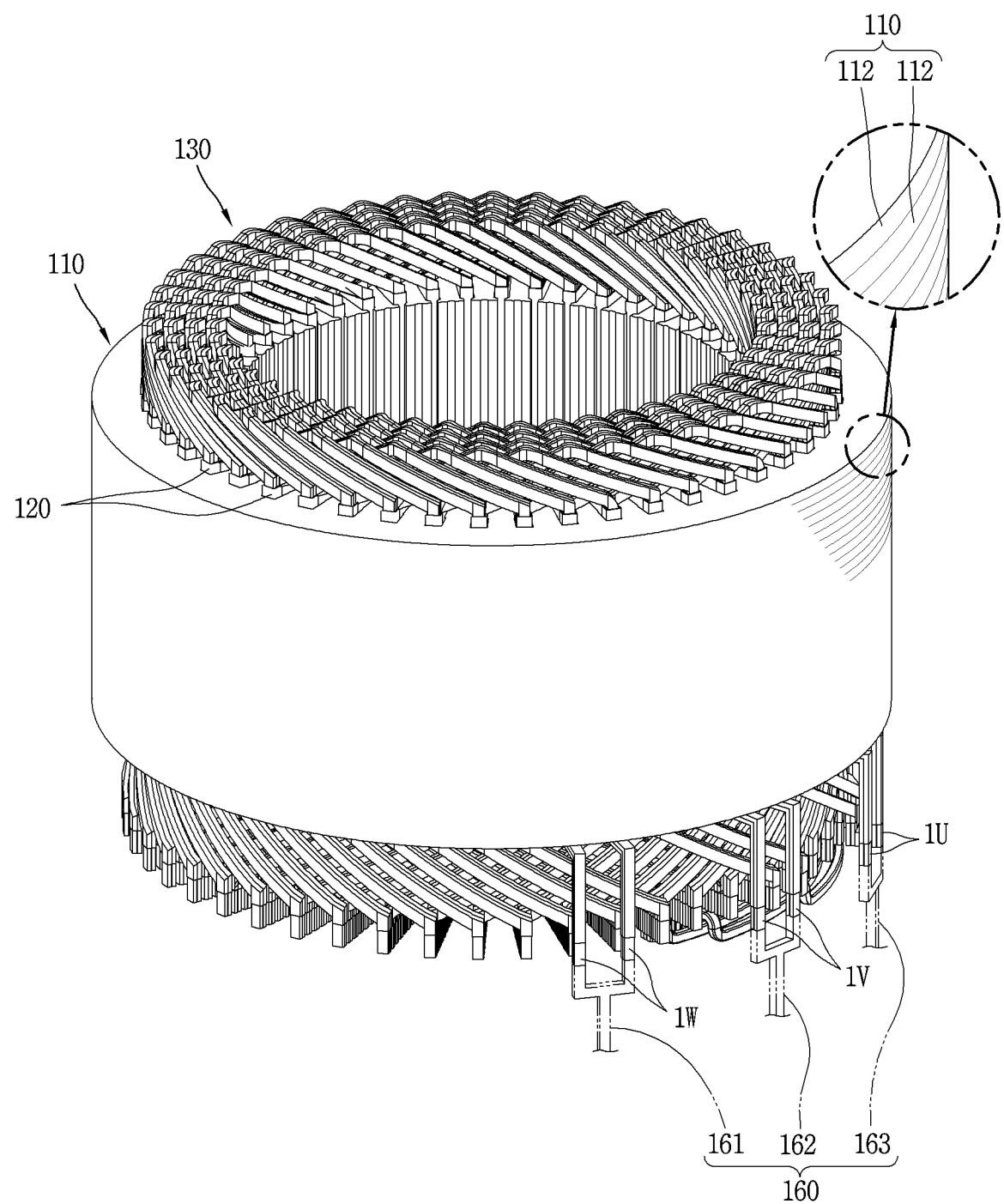
FIG. 1 is a perspective view of an example rotary electric machine.
Figure 2:
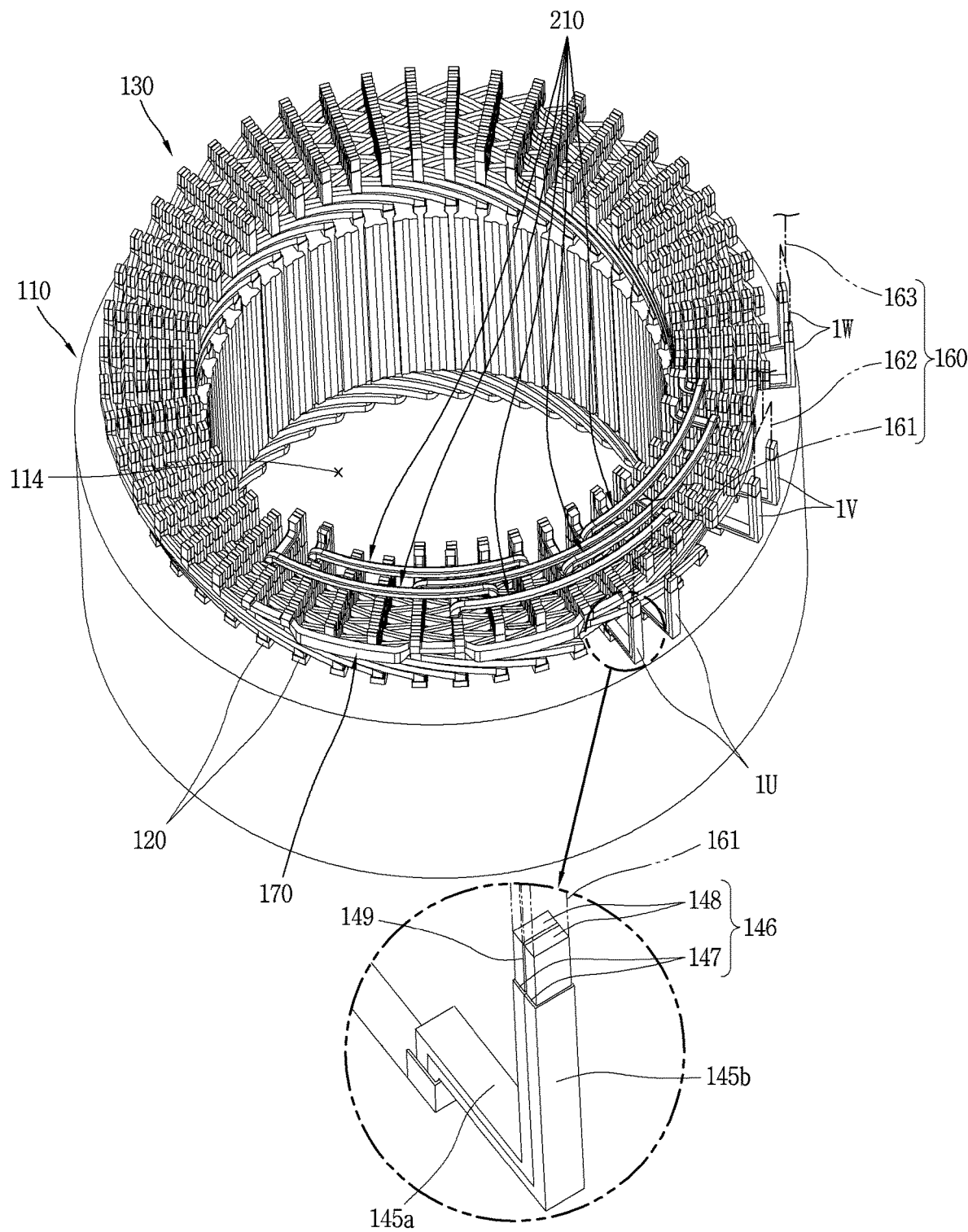
FIG. 2 is a perspective view showing a bottom surface of the example rotary electric machine of FIG. 1.
Figure 3:
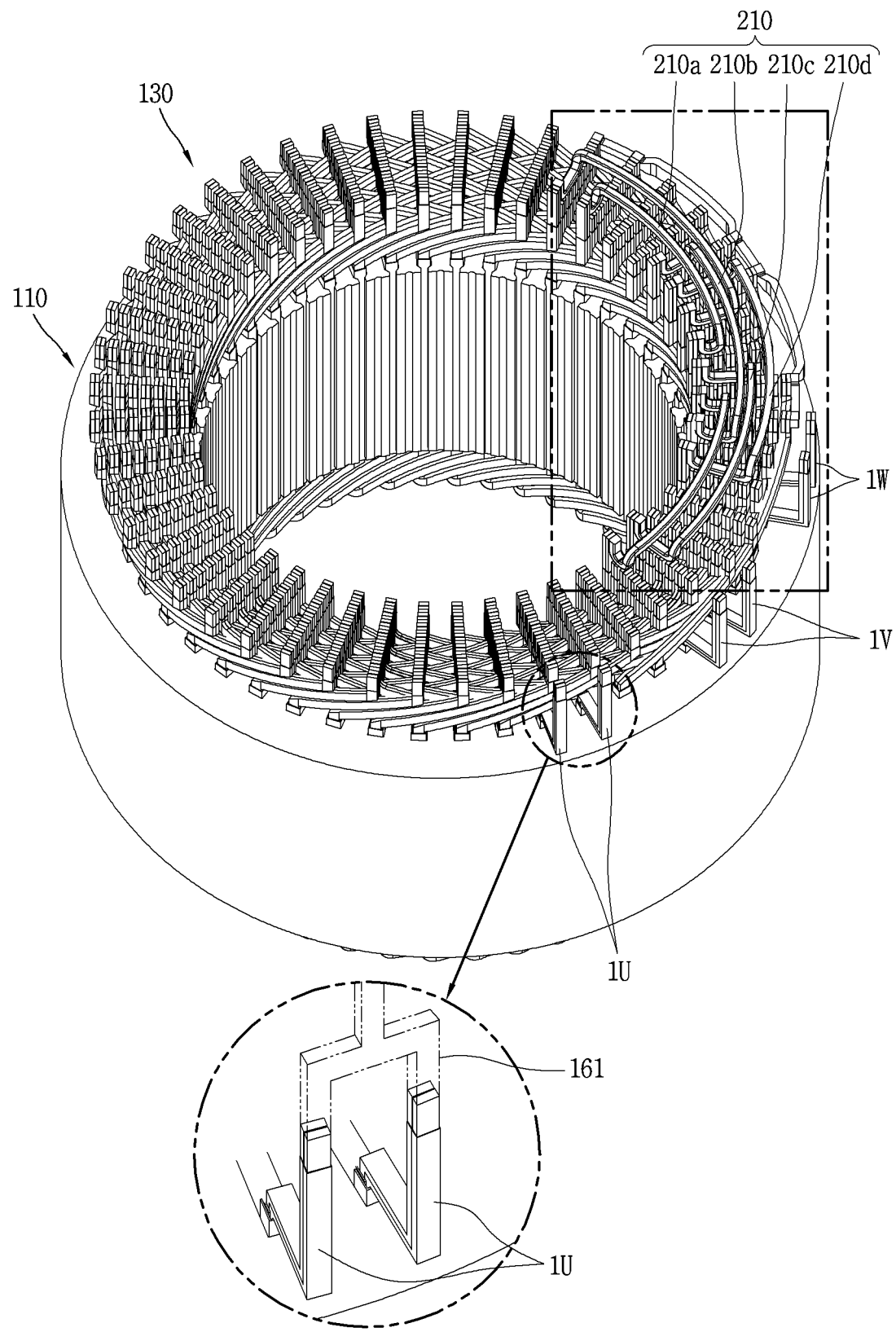
FIG. 3 is another perspective views showing the bottom surface of the example rotary electric machine of FIG. 1.
Figure 4:
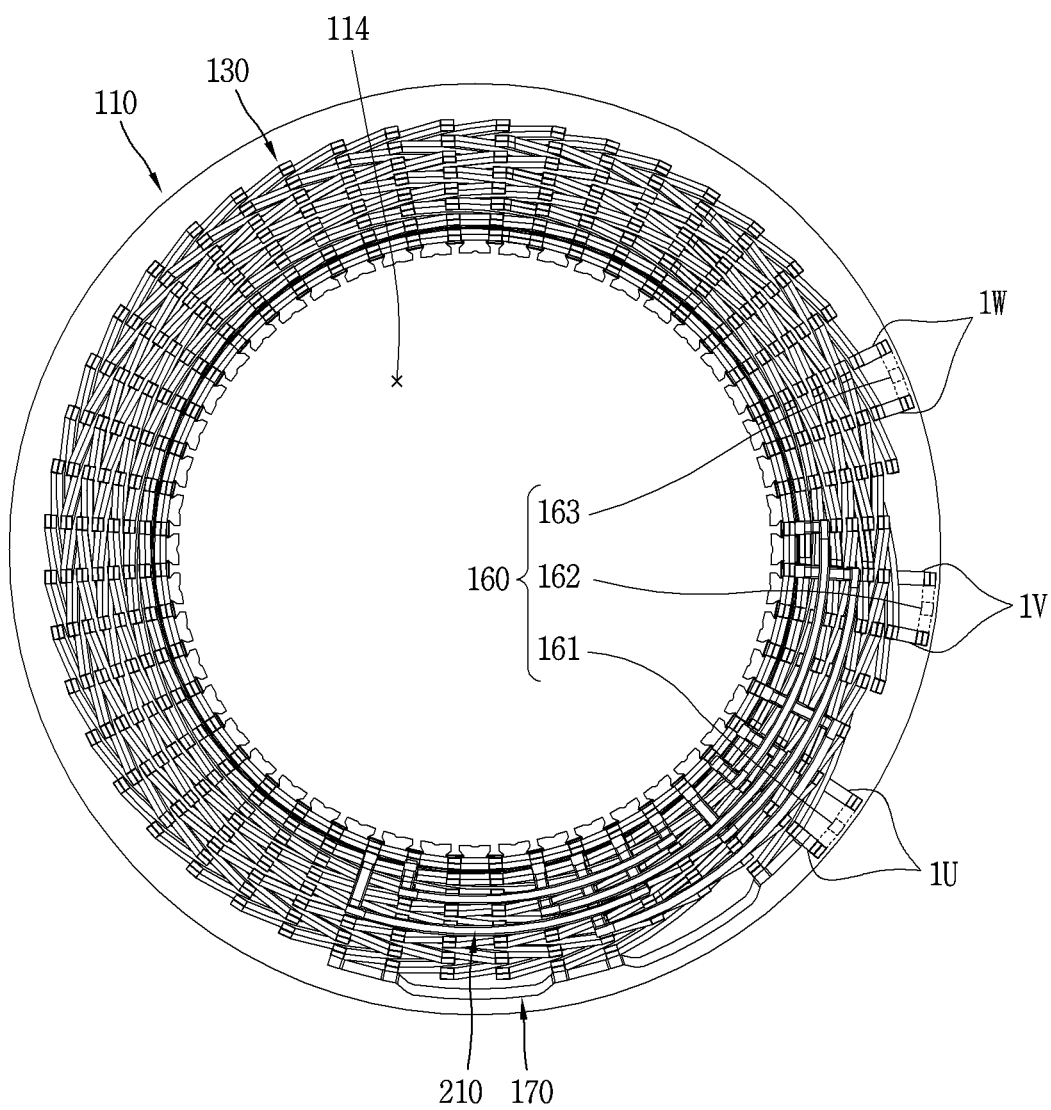
FIG. 4 is a planar view of FIG. 3.
Figure 5:
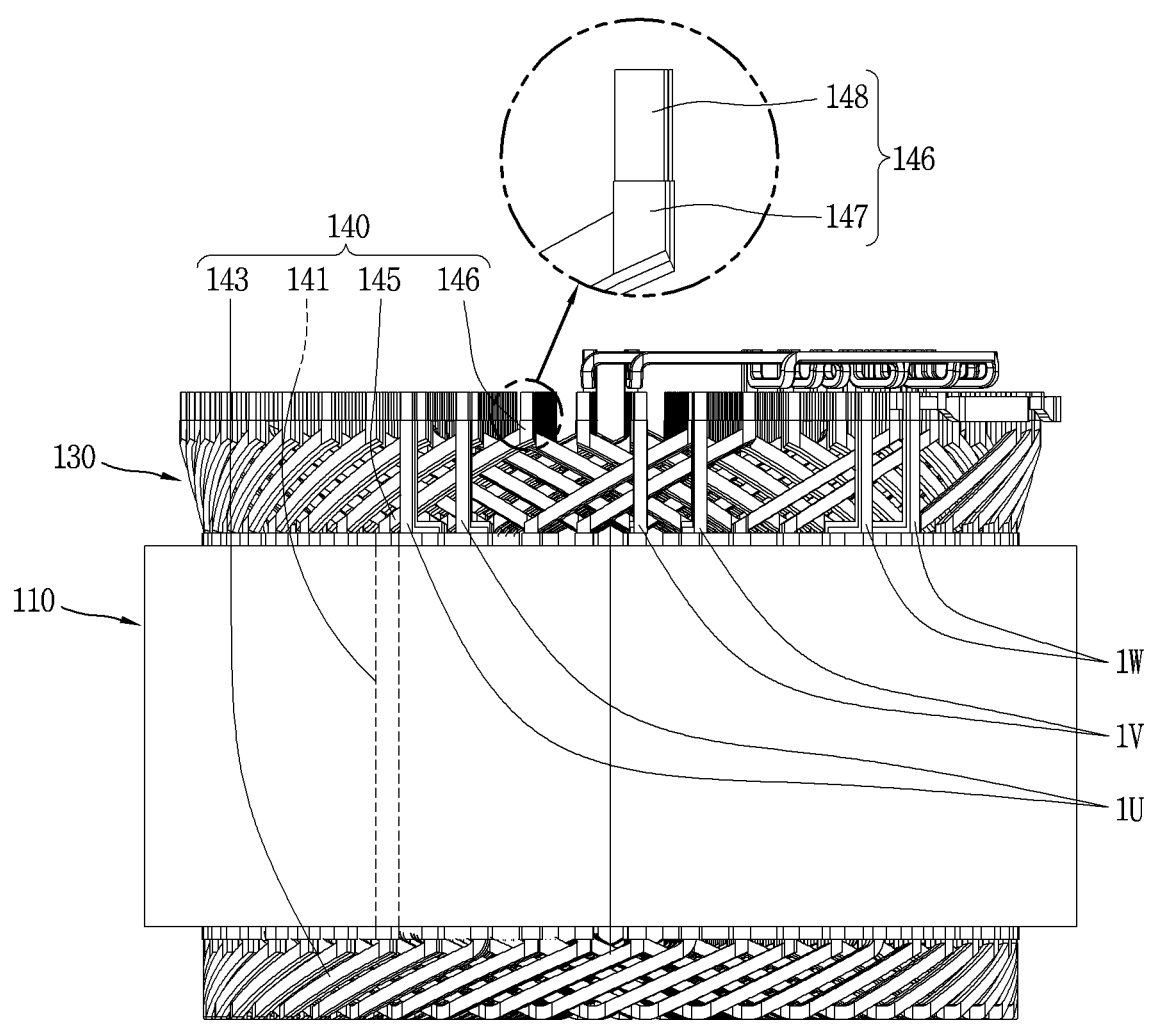
FIG. 5 is a side sectional view of FIG. 3.

FIG. 1 illustrates an examples rotary electric machine. FIGS. 2 and 3 are perspective views showing a bottom surface of the rotary electric machine shown in FIG. 1. FIG. 4 is a planar view of FIG. 3. FIG. 5 is a side sectional view of FIG. 3.

As shown in FIGS. 1 and 2, an example stator for a rotary electric machine may include a stator core 110 having a plurality of slots 116, and a stator coil 130 formed by connecting conductors 140 inserted into the plurality of slots 116 to each other so as to allow electrical conduction. The stator coil may be provided with a plurality of phase windings (phase windings) connected to a plurality of phases of a power source. Each of the plurality of phase windings may be provided with $1^{st}$~Nth conductors connected to each other in series and spaced from each other by 6 slot pitches. First conductors 1U, 1V, and 1W connected to a power line 160 may be arranged at an $n^{th}$ layer or an outermost layer located at an outermost side of one of the plurality of slots 116. Each of the plurality of phase windings may be provided with a plurality of unit patterns connected to each other in series, and the plurality of unit patterns may be connected to each other in series by a bridge conductor 210. And the conductors 140 connected to the bridge conductor 210 may be provided in a first layer or an inner most layer located at an innermost side of a corresponding slot 116.

For instance, the stator core 110 may be provided with a rotor accommodating opening 114 for rotatably accommodating a rotor at a central region thereof.

In some examples, the stator core 110 may be formed by a plurality of electric steel sheets 112 that are laminated on each other in an insulated state, each electric steel sheet 112 having the rotor accommodating opening 114 at a central region thereof. The stator core 110 may have a cylindrical shape or a circular shape.

The stator core 110 may be provided with a plurality of slots 116 spaced apart from each other by a preset interval in a circumferential direction. The stator core 110 may be provided with a plurality of slots 116 and poles 115 arranged to be alternate with each other in a circumferential direction of the rotor accommodating opening 114. The plurality of conductors 140 may be inserted into the plurality of slots 116.

Insulation members 120 for insulating the stator core from the plurality of conductors 140 may be inserted into the plurality of slots 116. The insulating members 120 may be inserted into the slots 116 before the plurality of conductors 140 are inserted in the slots 116.

The stator coil 130 may be formed by connecting the plurality of conductors 140 inserted into the plurality of slots 116 to each other in a preset pattern. The stator coil 130 may be provided with a plurality of phase windings connected to phases (e.g., U phase, V phase and W phase) of a power source.

For instance, the plurality of phase windings may include a first phase winding (a U-phase winding) 131, a second phase winding (a V-phase winding) 132, and a third phase winding (a W-phase winding) 133.

In some implementations, the plurality of phase windings may include a first partial phase winding and a second partial phase winding connected to each other in parallel. For example, the first partial phase winding may be provided with a first partial U-phase winding 131a, a first partial V-phase winding 132a, and a first partial W-phase winding 133a. Similarly, the second partial phase winding may be provided with a second partial U-phase winding 131b, a second partial V-phase winding 132b, and a second partial W-phase winding 133b.

The second phase winding 132 may be formed at one side of the first phase winding 131 in a spaced manner in a first direction. The third phase winding 133 may be formed at one side of the second phase winding 132 in a spaced manner in the first direction. In this example, the first direction means a counterclockwise direction along a circumferential direction of the stator core 110, in FIG. 2 for convenience, or a right direction on the drawing. A second direction opposite to the first direction means a clockwise direction along the circumferential direction of the stator core 110 shown in FIG. 2, or a left direction on the drawing.

Hereinafter, the first and second directions mean the same directions as those of FIG. 2.

For example, the second phase winding 132 may be formed to be spaced apart from the first phase winding 131 by 4 slot pitches in the first direction. Also, the third phase winding 133 may be formed to be spaced apart from the second phase winding 132 by 4 slot pitches in the first direction.

The slot pitch refers to an interval between two conductors inserted into the slots 116 of the stator core 110. One slot pitch means an interval between two conductors inserted into the two slots 116 consecutive with each other. The 4 slot pitches mean a case where one conductor is inserted into a first slot and another conductor is inserted into a $5^{th}$ slot ($4^{th}$ slot from the $1^{st}$ slot) in the first direction.

For instance, the third phase winding 133 is spaced apart from the first phase winding 131 by 8 slot pitches in the first direction.

As shown in FIGS. 1 and 2, one end of each of the plurality of phase windings is connected to the power line (e.g., a lead wire) 160.

The power line 160 may be connected to a commercial power (an alternating current power), and the commercial power may be supplied to the stator coil 130. Another end of each of the plurality of phase windings may be connected to a neutral line (a neutral point) 170.

Each of the plurality of phase windings may be provided with a plurality of bridge conductors 210 for serially-connecting the two conductors 140 spaced apart from each other by 6 slot pitches, so as to allow electrical conduction.

In some examples, as shown in FIG. 4, the plurality of bridge conductors 210 may be spaced apart from each other in a radial direction and a circumferential direction of the stator core 110.

In some examples, as shown in FIG. 5, the plurality of bridge conductors 210 may more protrude in an axial direction than an end part of a peripheral conductor 140 (a bent end part 146 to be explained later). The axial direction may be the lamination direction of the stator core 110.

Figure 6:
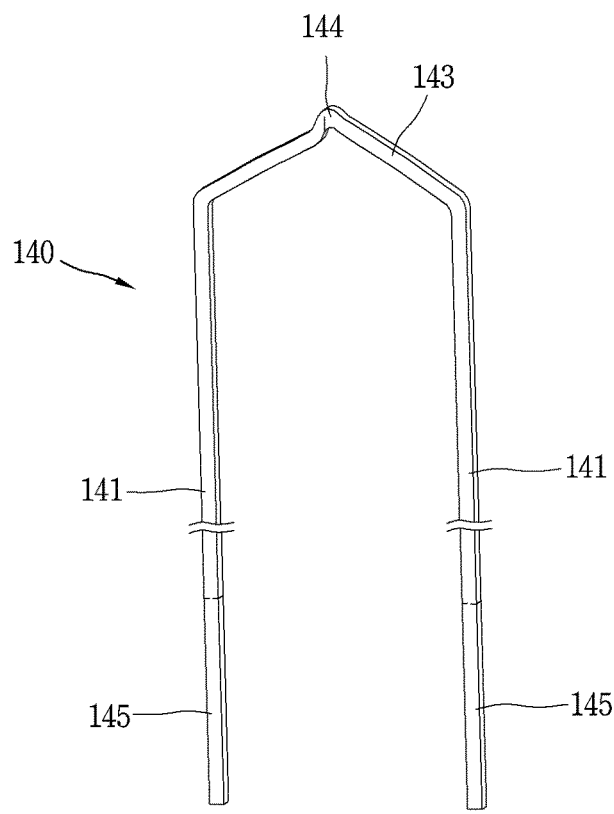
FIG. 6 is a perspective view showing an example conductor segment before being coupled to the rotary electric machine of FIG. 1.

Each of the plurality of phase windings may be provided with a plurality of conductor segments 140. FIG. 6 is a perspective view showing an example conductor segment before the conductor segments of FIG. 1 are coupled to a stator core.

As shown in FIG. 6, the conductor segment 140 may include two insertion portions 141 spaced apart from each other by 6 slot pitches among the plurality of slots 116, crossover portions 143 for connecting first ends of the two insertion portions 141 to each other so as to allow electrical conduction, and two extended portions 145 extended from second ends of the two insertion portions 141 by a length corresponding to 3 slot pitches.

In some examples, the conductor segment 140 may be formed by bending a conductor having a quadrangular sectional surface in an approximate 'U'-shape, the conductor having a length long enough to form the two insertion portions 141, the crossover portions 143, and the two extended portions 145.

The conductor segment 140 may be provided with an insulating layer or an insulating coating film 147 that covers an outer surface of the conductor and that is made of an insulating material.

Each of the conductor segments 140 may be provided with a cut-out portion 148 formed by cutting-out or removing the insulating layer 147 by a predetermined length to be connected to another conductor.

The conductor segments 140 may be connected to each other in series as the cut-out portions 148 contact each other so as to allow electrical conduction.

As shown in FIG. 6, the extended portions 145 may be formed to be extended from the insertion portions 141 in a lengthwise direction, before the conductor segment 140 is inserted into the slot 116 of the stator core 110.

A bent portion 144 bent in a thickness direction of the conductor segment 140 may be provided at the crossover portions 143.

In some examples, the two insertion portions 141 may be easily arranged in different layers of different slots 116. The different layers may be arranged in a radial direction of the stator core. For example, one of the insertion portions 141 may be inserted in the $8^{th}$ layer of $1^{st}$ slot, and the other of the insertion portions 141 may be inserted in the $7^{th}$ layer of $7^{th}$ slot.

Figure 7:
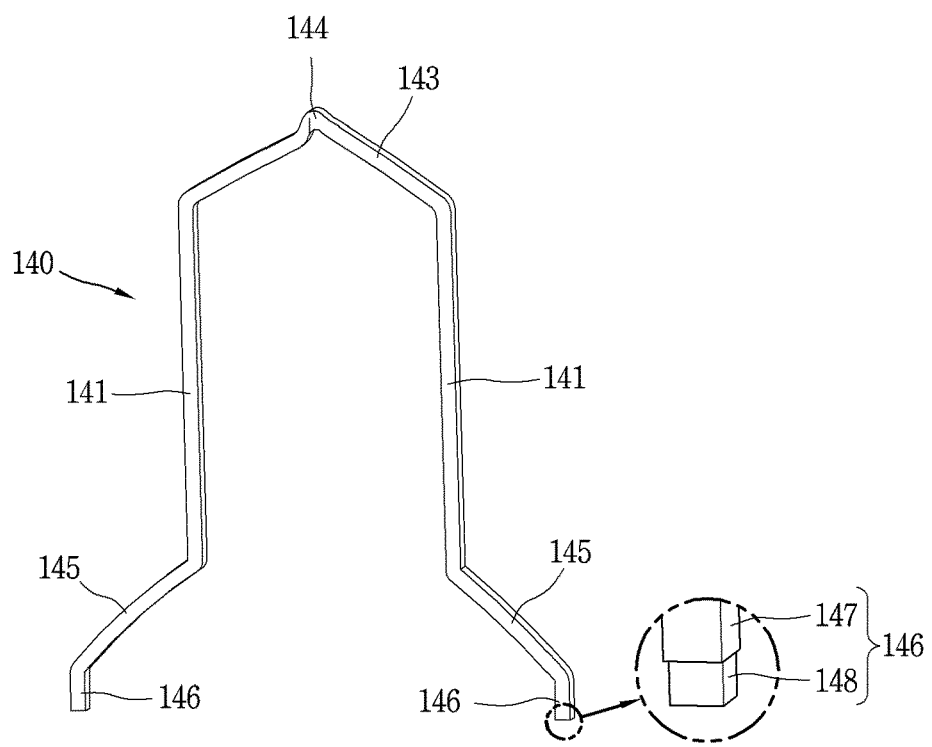
FIG. 7 is a view showing the example conductor segment in FIG. 6 having example extended portions bent after being coupled to the rotary electric machine of FIG. 1.

FIG. 7 is a view showing an example of the extended portions 145 that is bent after the conductor segment of FIG. 6 has been coupled to the stator core 110. As shown in FIG. 7, the extended portions 145 may be bent from end parts of the insertion portions 141, so as to be inclined in the first direction or the second direction.

Each of the extended portions 145 may be provided with a bent end portion 146 bent so as to be arranged in an axial direction at an end part thereof.

Each of the bent end portions 146 may be provided with a cut-out portion 148 at an end part thereof. Here, the cut-out portion 148 is formed by cutting-out or removing the insulating layer 147 for connecting with the bent end portion 146 of another conductor.

Figure 8:
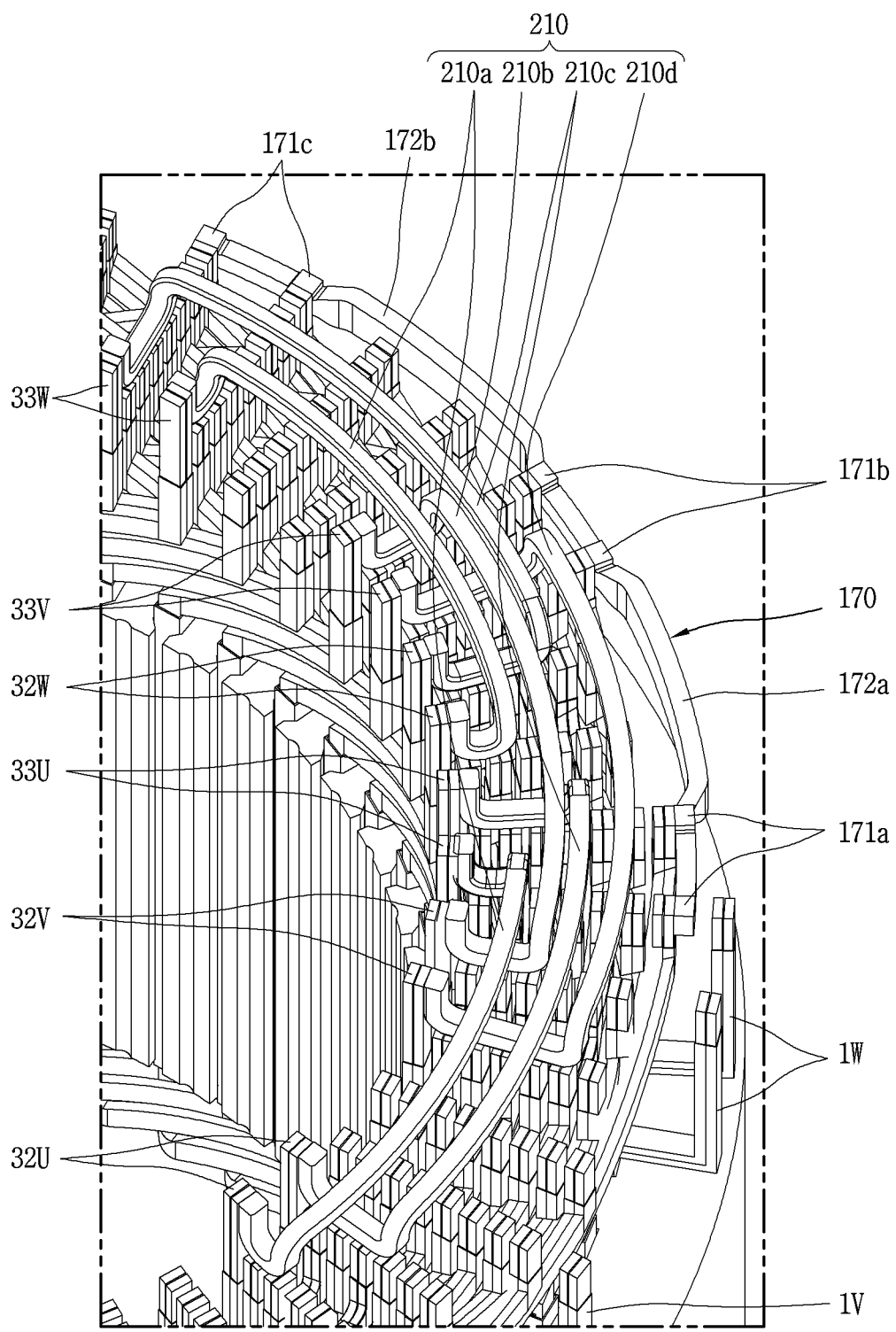
FIG. 8 is an enlarged perspective view showing an example main part of FIG. 3.
Figure 9:
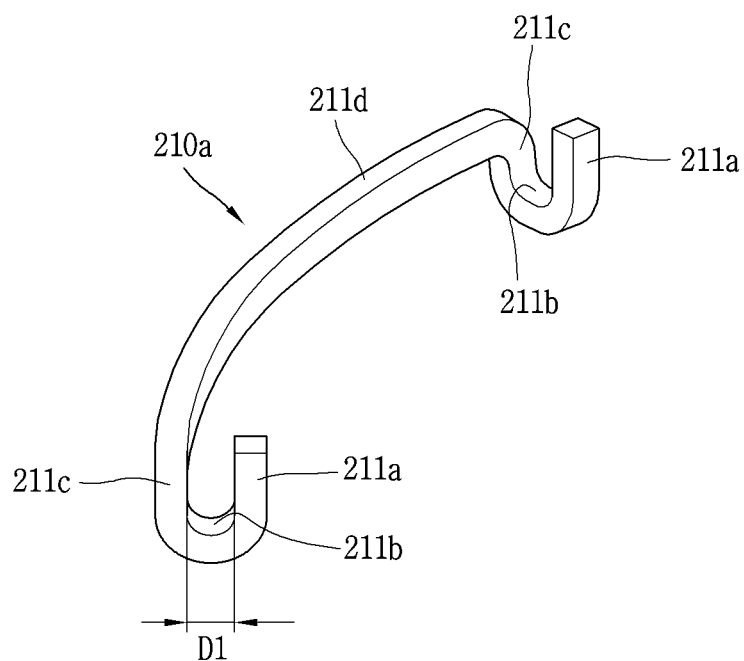
FIG. 9 is a perspective view of an example first bridge conductor shown in FIG. 8.
Figure 10:
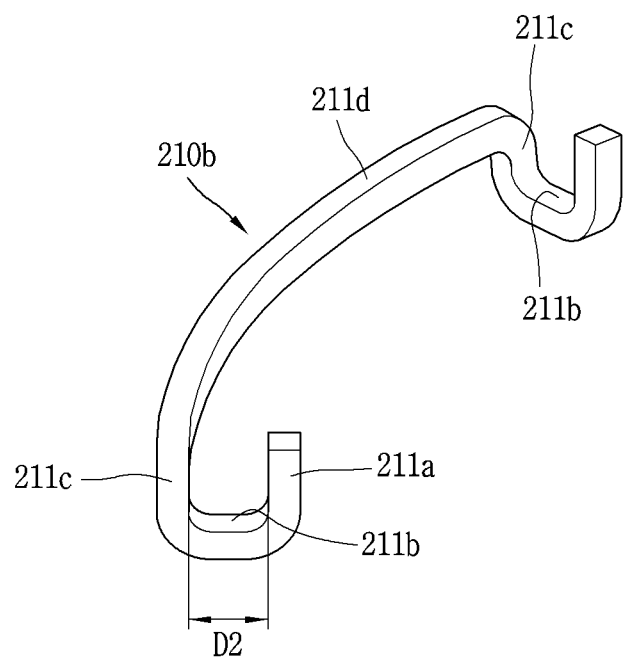
FIG. 10 is a perspective view of an example second bridge conductor shown in FIG. 8.
Figure 11:
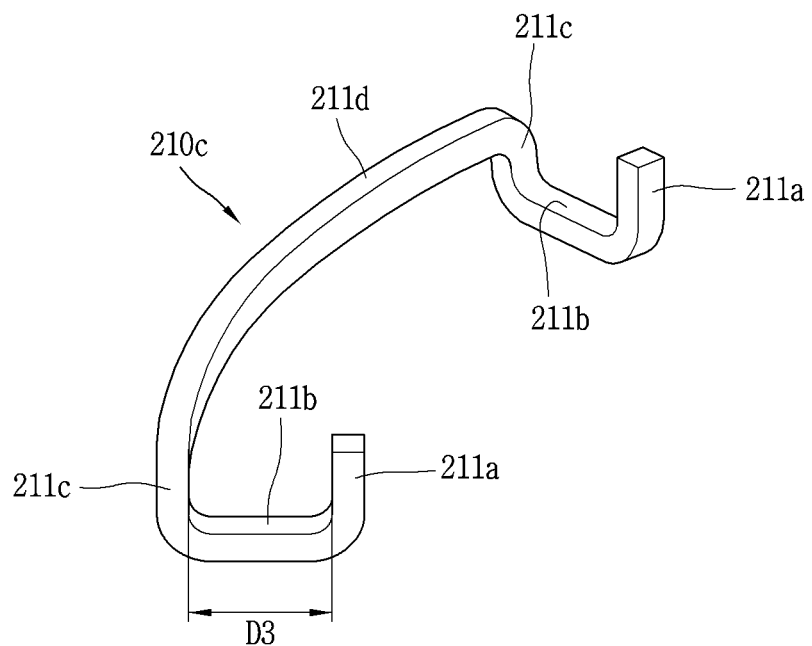
FIG. 11 is a perspective view of an example third bridge conductor shown in FIG. 8.
Figure 12:
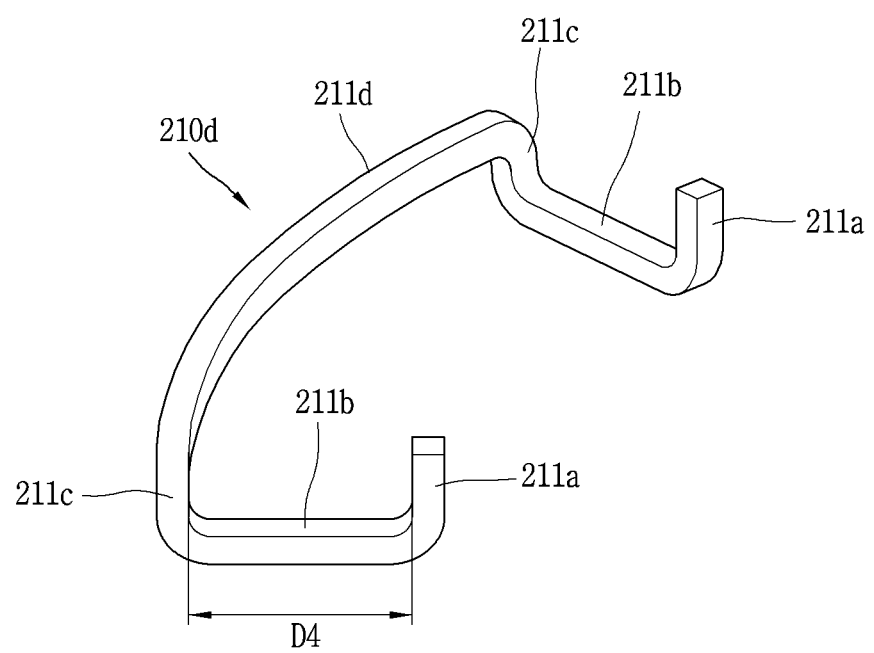
FIG. 12 is a perspective view of an example fourth bridge conductor shown in FIG. 8.

FIG. 8 is a perspective view showing an example main part of FIG. 3 in an enlarged manner. FIG. 9 is a perspective view of an example first bridge conductor of FIG. 8. FIG. 10 is a perspective view of an example second bridge conductor of FIG. 8. FIG. 11 is a perspective view of an example third bridge conductor of FIG. 8. FIG. 12 is a perspective view of an example fourth bridge conductor of FIG. 8.

As shown in FIG. 8, first and second unit patterns of the plurality of phase windings may be connected to each other by the bridge conductor 210.

The bridge conductor 210 may include conductor contact portions 211a which contact conductors, horizontal bent portions 211b horizontally curvedly-extended from the conductor contact portions 211a, vertical bent portions 211c vertically curvedly-extended from the horizontal bent portion 211b, and a crossover portion 211d for connecting the vertical bent portions 211c with each other.

For example, the bridge conductor 210 may be formed such that the horizontal bent portion 211b may have a different size or length. For instance, the bridge conductor 210 may include a first bridge conductor 210a, a second bridge conductor 210b, a third bridge conductor 210c, and a fourth bridge conductor 210d, each having a horizontal bent portions 211b with a different size. In some cases, the horizontal bent portion 211b may be spaced apart from a welding portion located at end parts of the other conductors by a preset interval.

Referring to FIGS. 9-12, the bridge conductor 210 may include a first bridge conductor 210a, a second bridge conductor 210b having horizontal bent portions 211b of a length (D2) longer than a length (D1) of the horizontal bent portions 211b of the first bridge conductor 210a, a third bridge conductor 210c having horizontal bent portions 211b of a length (D3) longer than the length (D2) of the horizontal bent portions 211b of the second bridge conductor 210b, and a fourth bridge conductor 210d having horizontal bent portions 211b of a length (D4) longer than the length (D3) of the horizontal bent portions 211b of the third bridge conductor 210c.

In some examples, the crossover portion 211d of one bridge conductor 210 may be arranged at one side of the horizontal bent portions 211b of the second bridge conductor 210b, in a spaced manner so as to allow insulation.

For instance, the crossover portions 211d of two bridge conductors 210 may be arranged at one side of the horizontal bent portions 211b of the third bridge conductor 210c, in a spaced manner so as to allow insulation.

For instance, the crossover portions 211d of three bridge conductors 210 may be arranged at one side of the horizontal bent portions 211b of the fourth bridge conductor 210d, in a spaced manner so as to allow insulation.

In the example shown in FIG. 8, the bridge conductor 210 is provided with 4 bridge conductors of different sizes. However, this is merely exemplary, and the number of the bridge conductors may be properly controlled.

With such a configuration, as shown in FIG. 4, last conductor of the first unit pattern and first conductor of the second unit pattern of each of a plurality of phase windings of the stator coil 130, may be arranged in first layer 151a of a corresponding slot. Thus, the first and second unit patterns of the same phase winding may be easily connected to each other without interference by using the first bridge conductor 210a, the second bridge conductor 210b, the third bridge conductor 210c, and the fourth bridge conductor 210d.

Hereinafter, an example method of connecting conductors of the stator coil of the stator for a rotary electric machine to each other will be explained with reference to FIGS. 13 to 19.

Figure 13:
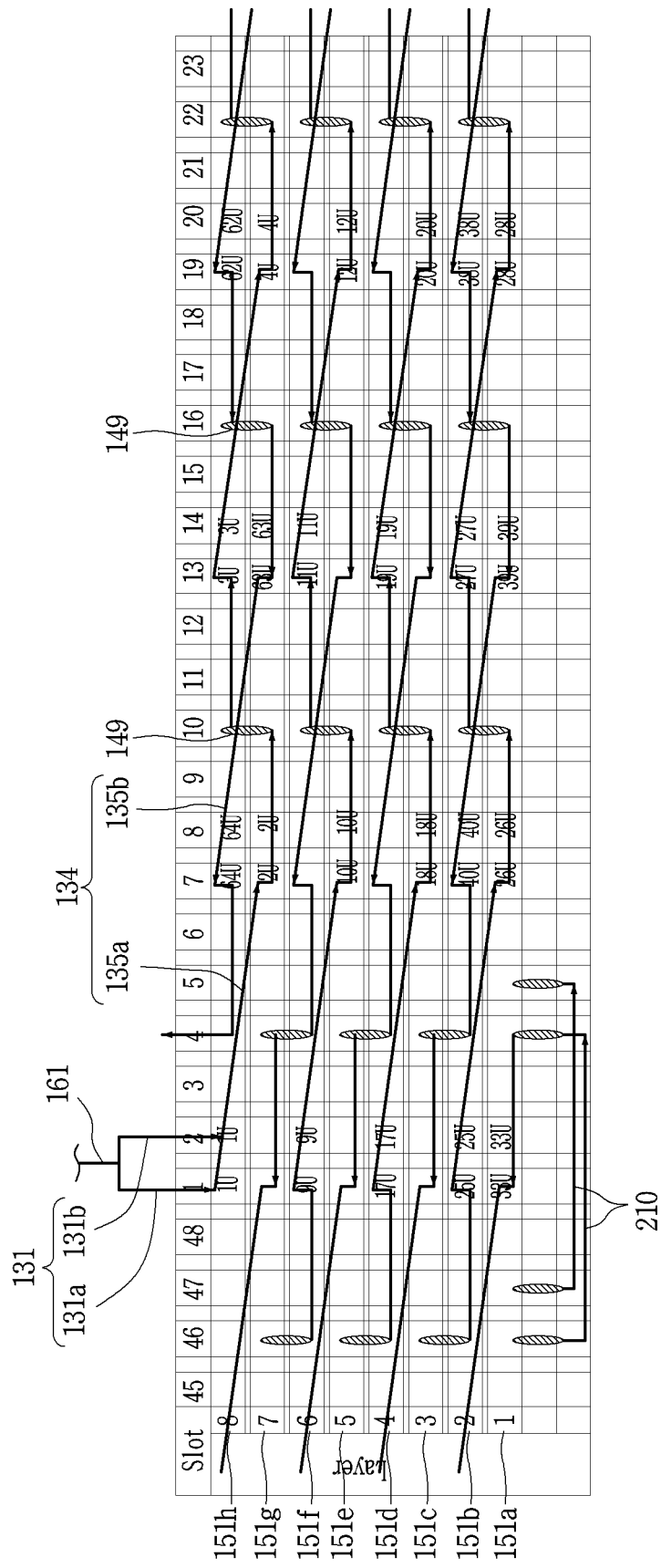
FIG. 13 is a view showing an example connected state of an example first-phase winding (U-phase) of the rotary electric machine shown in FIG. 1.
Figure 14:
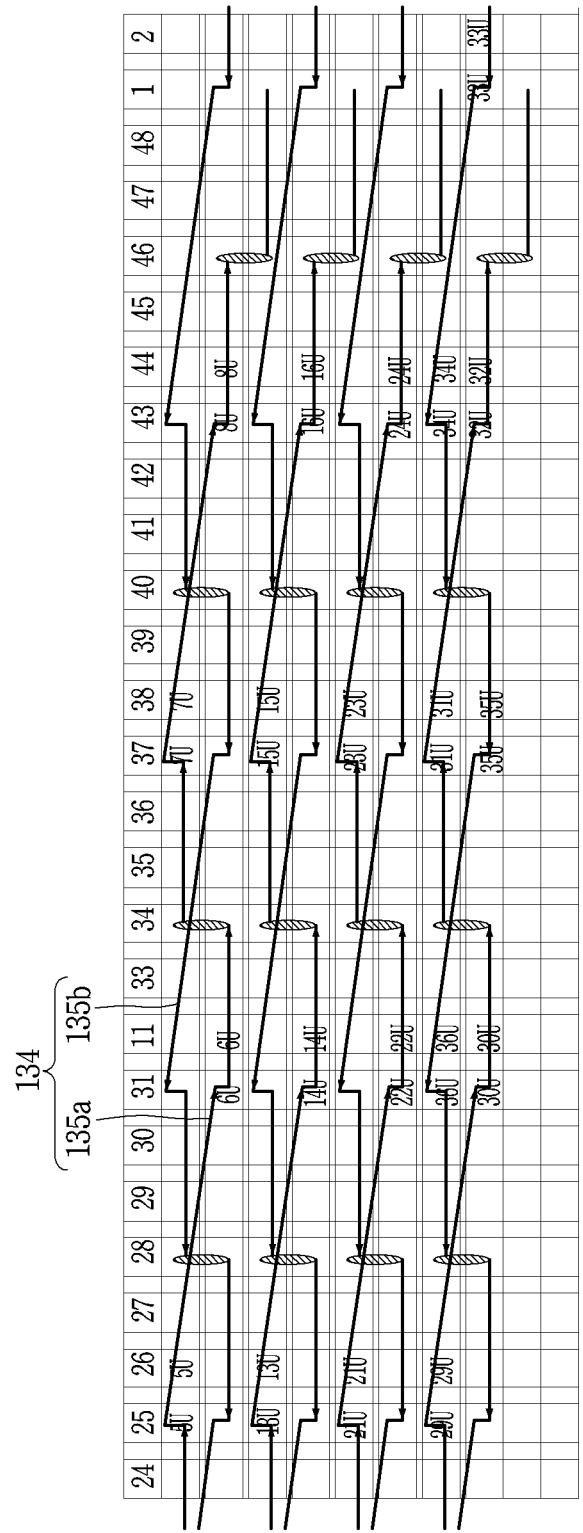
FIG. 14 is a view continuing from FIG. 13 and showing the example connected state of the example first-phase winding (U-phase) of the rotary electric machine shown in FIG. 1.
Figure 15:
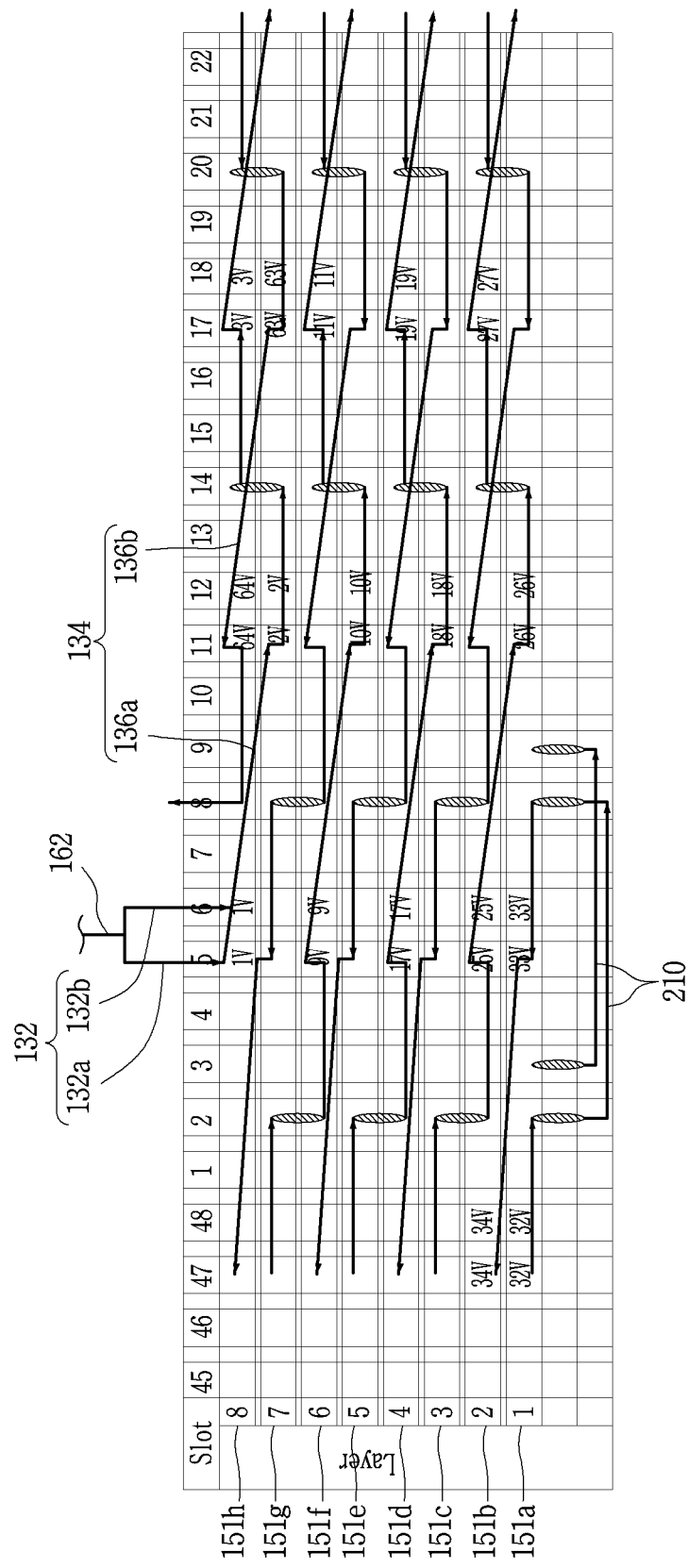
FIG. 15 is a view showing an example connected state of an example second-phase winding (V-phase) of the rotary electric machine shown in FIG. 1.
Figure 16:
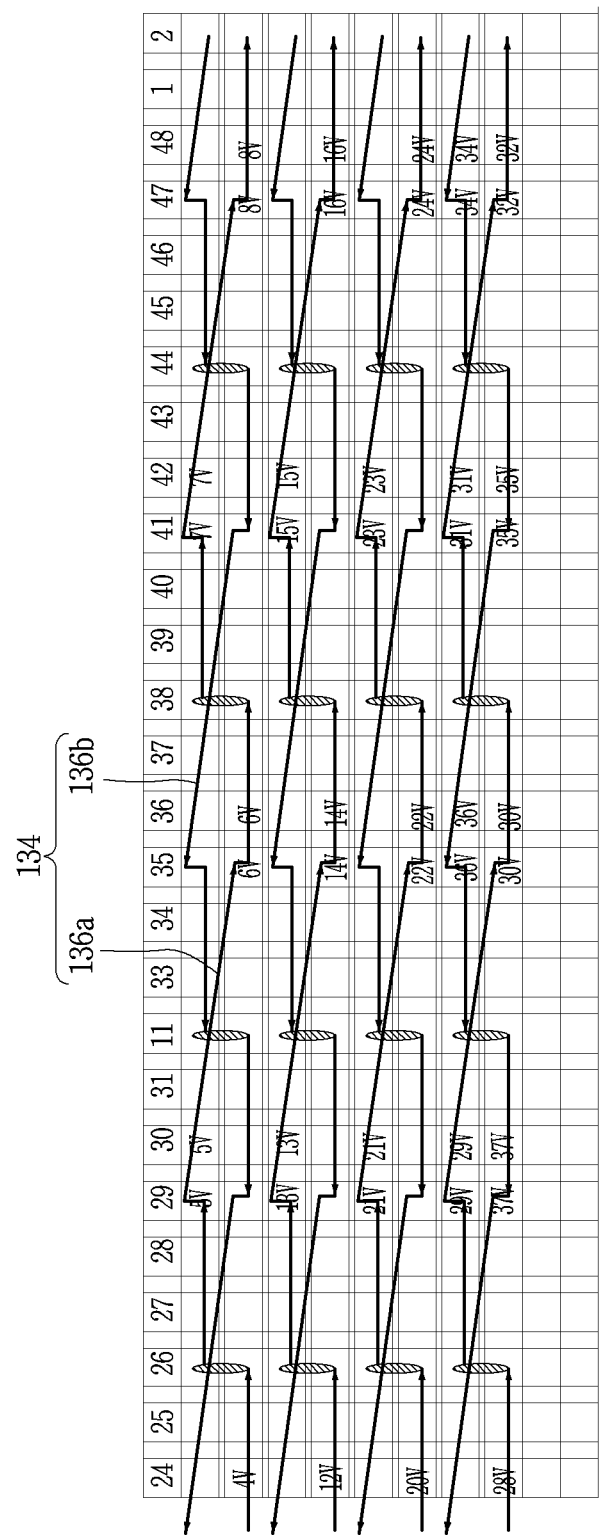
FIG. 16 is a view continuing from FIG. 15 and showing the example connected state of the example second-phase winding (V-phase) of the rotary electric machine shown in FIG. 1.
Figure 17:
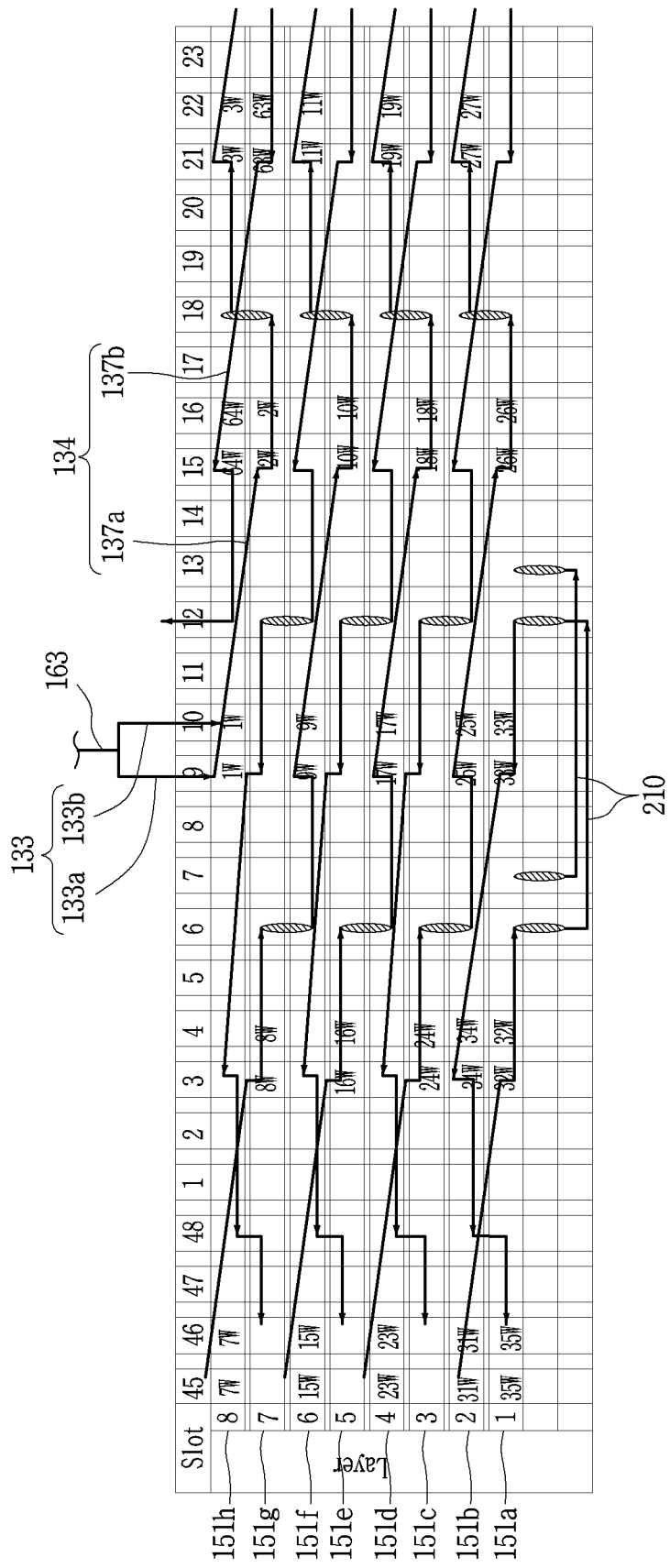
FIG. 17 is a view showing an example connected state of an example third-phase winding (W-phase) of the rotary electric machine shown in FIG. 1.
Figure 18:
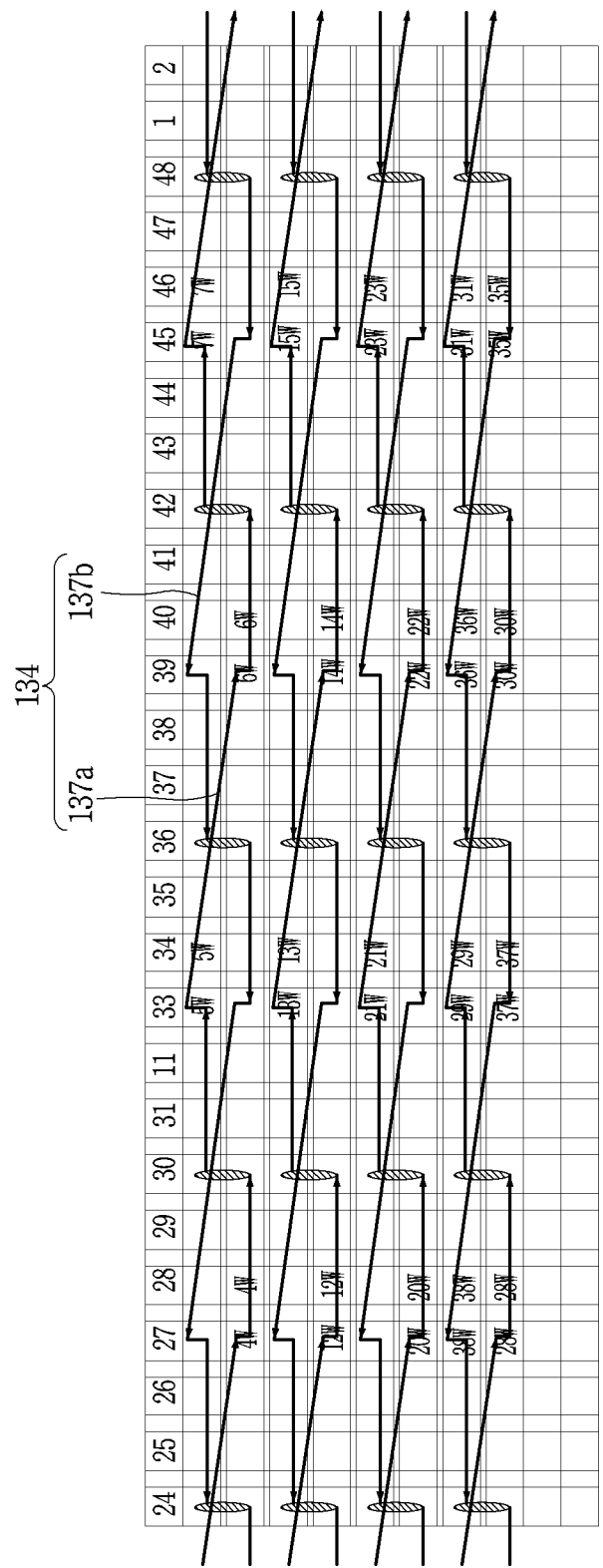
FIG. 18 is a view continuing from FIG. 17 and showing the example connected state of the example third-phase winding (W-phase) of the rotary electric machine shown in FIG. 1.
Figure 19:
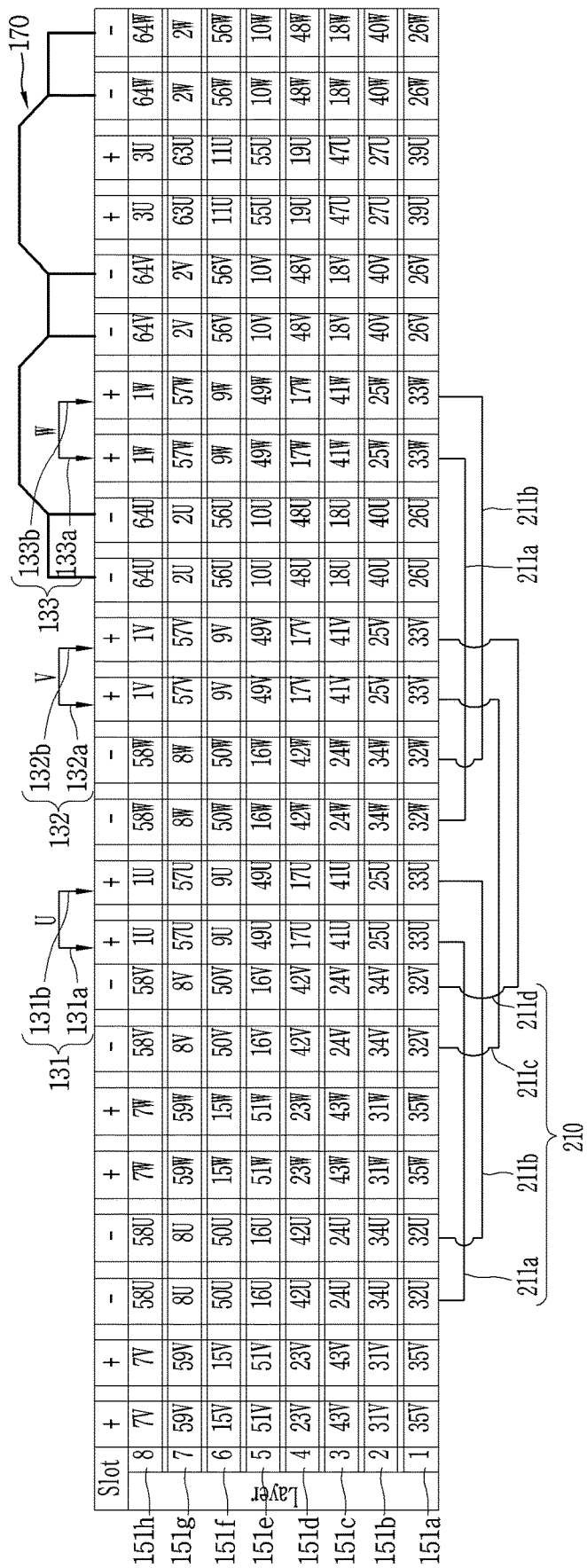
FIG. 19 is a view showing an example inserted state of each conductor of the rotary electric machine shown in FIG. 1 into a slot.

FIGS. 13 and 14 illustrate an example connection state of a first-phase winding (U-phase) of FIG. 1. FIGS. 15 and 16 illustrate an example connection state of a second-phase winding (V-phase) of FIG. 1. FIGS. 17 and 18 illustrate an example connection state of a third-phase winding (W-phase) of FIG. 1. FIG. 19 illustrate an example state of each conductor of FIG. 1 inserted into a slot.

As shown in FIGS. 13 and 14, the first-phase winding (U-phase winding) 131 is provided with a first partial U-phase winding 131a and a second partial U-phase winding 131b.

For instance, the stator may be provided with 48 slots. 8 conductors (the insertion portions 141 of the conductor segments 140) may be inserted into slots of the stator, in order to form $1^{st}$ to $8^{th}$ layers 151a to 151h.

The first layer 151a may be arranged at an inner side of the 8 conductors 140 in the slots 116, and the $8^{th}$ layer 151h may be arranged at an outermost side in the same slot 116, in a radial direction of the stator core 110.

In some implementations, each of the 8 conductors 140 may be formed as a 2-line integrated type. The 2-line integrated type means operations to fold two conductor segments 140 having the same shape and size in an overlapped manner, and to simultaneously curve (bend), insert, twist and weld the two conductor segments 140. That is, since the 8 conductors in the slots 116 are formed in such a 2-line integrated manner, 16 conductors may be substantially formed in the slots 116.

Each of the first partial U-phase winding 131a and the second partial U-phase winding 131b of the first phase winding 131 may be provided with $1^{st}$ to $64^{th}$ conductors (1U~64U) spaced apart from each other by 6 slot pitches and connected to each other in series to form a circuit. Each of the first partial U-phase winding 131a and the second partial U-phase winding 131b of the first phase winding 131 may be provided with a plurality of unit patterns spaced apart from each other in a circumferential direction of the stator core 110 and connected to each other in series.

For instance, the plurality of unit patterns may include a first unit pattern 135a having a plurality of conductors 140 that include the first conductor (1U) and that are spaced apart from each other by 6 slot pitches in the first direction along a circumferential direction of the stator core 110, and a second unit pattern 135b having a plurality of conductors 140 that include the Nth conductor and that are spaced apart from each other by 6 slot pitches in the second direction opposite to the first direction.

The first unit pattern 135a and the second unit pattern 135b of the first partial U-phase winding 131a of the first phase winding 131 are the same as the first unit pattern 135a and the second unit pattern 135b of the second partial U-phase winding 131b of the first phase winding 131, except for that the second partial U-phase winding 131b is spaced apart from the first partial U-phase winding 131a by one slot pitch in the first direction, because the connection method (pattern) among the conductors is the same. Accordingly, only the first unit pattern 135a and the second unit pattern 135b of the first partial U-phase winding 131a will be explained hereinafter.

For instance, the first unit pattern 135a of the first partial U-phase winding 131a may be provided with $1^{st}$ to $32^{nd}$ conductors (1U~32U) connected to the power line 160. The second unit pattern 135b of the first partial U-phase winding 131a may be provided with $33^{rd}$ to $64^{th}$ conductors (33U~64U). Here, the 33U is the first conductor connected to the last conductor of the first unit pattern 135a (i.e., 32U), and the 64U is the last conductor of the second unit pattern 135b.

The first conductor (1U) of the first unit pattern 135a of the first partial U-phase winding 131a may be inserted into the first slot of the stator core 110, for instance.

In this example, for convenience, the first conductor (1U) is provided in the first slot. However, the position of the slot is not limited to the first slot and may be properly controlled.

The first conductor (1U) may be arranged in the $8^{th}$ layer 151h of the first slot. The second conductor (2U), which forms the conductor segment 140 with the first conductor (1U) as a pair, may be arranged in the $7^{th}$ slot spaced apart from the first conductor (1U) by 6 slot pitches in the first direction.

The second conductor (2U) may be arranged in the $7^{th}$ layer 151g such that its layer number is less than that of the first conductor (1U) by one.

Third conductor (3U) connected to the second conductor (2U) may be arranged in $13^{th}$ slot spaced apart from the second conductor (2U) by 6 slot pitches in the first direction. The third conductor (3U) may be arranged in the $8^{th}$ layer 151h of the $13^{th}$ slot such that its layer number is greater than that of the second conductor (2U) by one.

The extension portions 145 of the second conductor (2U) may be bent in the first direction, and the extension portions 145 of the third conductor (3U) may be bent in the second direction. As a result, the second conductor (2U) and the third conductor (3U) may be coupled to each other by welding at a position of $10^{th}$ slot, an intermediate region. Welding portions 149 of the second conductor (2U) and the third conductor (3U) are illustrated on the position of the $10^{th}$ slot of the stator core 110.

Likewise, the fourth conductor (4U) which forms the conductor segment 140 with the third conductor (3U) may be arranged in the $7^{th}$ layer 151g of the $19^{th}$ slot spaced apart from the third conductor (3U) in the first direction.

In the same manner, the $5^{th}$ conductor (5U) may be arranged in the $8^{th}$ layer 151h of $25^{th}$ slot, and the $6^{th}$ conductor (6U) may be arranged in the $7^{th}$ layer 151g of $31^{st}$ slot. Welding portions 149 of the $4^{th}$ conductor (4U) and the $5^{th}$ conductor (5U) may be formed at one side of the $22^{nd}$ slot, an intermediate region.

The $7^{th}$ conductor (7U) may be arranged in the $8^{th}$ layer 151h of the $37^{th}$ slot, and the $8^{th}$ conductor (8U) may be arranged in the $7^{th}$ layer 151g of the $43^{rd}$ slot. The $9^{th}$ conductor (9U) may be inserted into the first slot spaced apart from the $8^{th}$ conductor (8U) by 6 slot pitches in the first direction with a layer difference by one. Since the $8^{th}$ conductor (8U) is arranged in the $7^{th}$ layer 151g, the $9^{th}$ conductor (9U) may be arranged in the $6^{th}$ layer 151f of the first slot.

$10^{th}$ conductor (10U) may be inserted into the $7^{th}$ slot spaced apart from the $9^{th}$ conductor (9U) by 6 slot pitches in the first direction. However, since the second conductor (2U) is in an inserted state into the $7^{th}$ layer 151g of the $7^{th}$ slot, the 10$^{th}$ conductor (10U) may be arranged in the 5$^{th}$ layer 151e such that a layer difference by one may occur.

Likewise, an 11$^{th}$ conductor (11U) may be arranged in the 6$^{th}$ layer 151f of 13$^{th}$ slot. In the aforementioned manner, 12$^{th}$ to 32$^{nd}$ conductors (12U~32U) may be arranged in corresponding layers of slots, by 6 slot pitches in the first direction.

The 32$^{nd}$ conductor (32U), which is the last conductor of the first unit pattern 135a of the first partial U-phase winding 131a, may be arranged in the first layer 151a of the 43$^{rd}$ slot.

The 33$^{rd}$ conductor (33U), which is the first conductor of the second unit pattern 135b and connected to the 32$^{nd}$ conductor (32U), may be arranged in the first layer 151a of first slot spaced apart from the 32$^{nd}$ conductor (32U) by 6 slot pitches, in the first direction.

For instance, the bent end portion 146 of the extended portion 145 of the 32$^{nd}$ conductor (32U) may be bent in the first direction to be arranged at one side of the 46$^{th}$ slot. The bent end portion of the extended portions 145 of the 33$^{rd}$ conductor (33U) may be bent in the first direction to be arranged at one side of the 4$^{th}$ slot.

The bent end portion 146 of the 32$^{nd}$ conductor (32U) and the bent end portion 146 of the 33$^{rd}$ conductor (33U) may contact the contact portions 211a of the bridge conductor 210 to thus allow electrical conduction, and may be integrally coupled to each other by welding.

Likewise, the 32$^{nd}$ conductor (32U), which is the last conductor of the first unit pattern 135a of the second partial U-phase winding 131b, may be arranged in the first layer 151a of 44$^{th}$ slot. The 33$^{rd}$ conductor (33U), which is the first conductor of the second unit pattern 135b of the second partial U-phase winding 131b, may be arranged in the first layer 151a of second slot.

The 32$^{nd}$ conductor (32U) (the last conductor of the first unit pattern 135a of the second partial U-phase winding 131b) and the 33$^{rd}$ conductor (33U) (the first conductor of the second unit pattern 135b) may be connected to each other in series by the bridge conductor 210, and may be integrally coupled to each other by welding.

The 34$^{th}$ conductor (34U) which forms the conductor segment 140 together with the 33$^{rd}$ conductor (33U) may be arranged in the 43$^{rd}$ slot spaced apart from the 33$^{rd}$ conductor (33U) by 6 slot pitches, in the second direction. The 34$^{th}$ conductor (34U) may be arranged in the second layer 151b of the 43$^{rd}$ slot, because it has a layer difference from the 33$^{rd}$ conductor (33U).

The 35$^{th}$ conductor (35U) connected to the 34$^{th}$ conductor (34U) may be arranged in the first layer 151a of the 37$^{th}$ slot spaced apart from the 34$^{th}$ conductor (34U) by 6 slot pitches in the second direction.

As the extended portion 145 of the 34$^{th}$ conductor (34U) is bent in the first direction, the bent end portion 146 may be arranged at one side of the 40$^{th}$ slot. As the extended portion 145 of the 35$^{th}$ conductor (35U) is bent in the second direction, the bent end portion 146 may be arranged at the one side of the 40$^{th}$ slot so as to contact the bent end portion 146 of the extended portion 145 of the 34$^{th}$ conductor (34U). Accordingly, the 34$^{th}$ conductor (34U) and the 35$^{th}$ conductor (35U) may be coupled to each other by welding so as to allow electrical conduction.

The 36$^{th}$ conductor (36U) which forms the conductor segment 140 together with the 35$^{th}$ conductor (35U) may be arranged in the second layer 151b of 31$^{st}$ slot. The 37$^{th}$ to 41$^{st}$ conductors (37U~41U) may be arranged to be connected to each other in the second direction and spaced apart by 6 slot pitches from the 36$^{th}$ conductor (36U). The 41$^{st}$ conductor (41U) may be arranged outside the 33$^{rd}$ conductor (33U). The 41$^{st}$ conductor (41U) may be arranged in the third layer 151c of the first slot.

If the conductors are inserted to be connected to each other in the second direction with a layer difference by one (increase or decrease), by 6 slot pitches from the 41$^{st}$ conductor (41U), in the aforementioned manner, the 64$^{th}$ conductor (64U) (the last conductor) may be arranged in the 8$^{th}$ layer 151h of the 7$^{th}$ slot spaced apart from the first conductor (1U) by 6 slot pitches in the first direction.

Likewise, the 64$^{th}$ conductor (64U), the last conductor of the second partial U-phase winding 131b may be arranged in the 8$^{th}$ layer 151h of 8$^{th}$ slot spaced apart from the first conductor (1U) of the second partial U-phase winding 131b, by 6 slot pitches in the first direction.

As aforementioned, the second phase winding 132 may be spaced apart from the first phase winding 131 by 4 slot pitches in the first direction. The second phase winding 132 may be provided with a first partial V-phase winding 132a and a second partial V-phase winding 132b. The first partial V-phase winding 132a may be provided with 1$^{st}$ to 64$^{th}$ conductors (1V~64V) connected to each other in series and spaced apart from each other by 6 slot pitches. The second partial V-phase winding 132b may be provided with 1$^{st}$ to 64$^{th}$ conductors (1V~64V) connected to each other in series and spaced apart from each other by 6 slot pitches.

Each of the first partial V-phase winding 132a and the second partial V-phase winding 132b may be provided with a first unit pattern 136a connected in series in the first direction, and a second unit pattern 136b connected in series in the second direction.

As shown in FIGS. 15 and 16, the first conductor (1V) of the first partial V-phase winding 132a may be arranged in the 8$^{th}$ layer 151h of the 5$^{th}$ slot. The first conductor (1V) of the second partial V-phase winding 132b may be arranged in the 8$^{th}$ layer 151h of the 6$^{th}$ slot spaced apart from the first conductor (1V) of the first partial V-phase winding 132a by one slot pitch in the first direction.

2$^{nd}$ to 32$^{nd}$ conductors (2V~32V) of the first partial V-phase winding 132a are connected to each other in the 7$^{th}$ layer 151g in 11$^{th}$ slot with a layer difference by one, and are spaced from the first conductor (1V) of the first partial V-phase winding 132a by 6 slot pitches in the first direction. And the 32$^{nd}$ conductor (32V) may be arranged in the first layer 151a of the 47$^{th}$ slot.

33$^{rd}$ conductor (33V), the first conductor of the second unit pattern 136b of the first partial V-phase winding 132a, connected to the 32$^{nd}$ conductor (32V) of the first partial V-phase winding 132a, may be arranged in the first layer 151a of 5$^{th}$ slot.

The 32$^{nd}$ conductor (32V) and the 33$^{rd}$ conductor (33V) of the first partial V-phase winding 132a may be connected to each other in series by the bridge conductor 210, and may be integrally coupled to each other by welding.

34$^{th}$ to 64$^{th}$ conductors (34V~64V) of the second unit pattern 136b of the first partial V-phase winding 132a are spaced apart from the 33$^{rd}$ conductor (33V) by 6 slot pitches in the second direction, and are arranged with a layer difference by one and then are connected to each other in series. And the 64$^{th}$ conductor (64V) may be arranged in the 8$^{th}$ layer 151h of the 11$^{th}$ slot spaced apart from the first conductor (1V) by 6 slot pitches in the first direction.

The 64$^{th}$ conductor (64V), which is the last conductor of the second unit pattern 136b of the second partial V-phase winding 132b may be arranged in the 8$^{th}$ layer 151h of the 12$^{th}$ slot.

The third phase winding 133 may be formed to be spaced apart from the second phase winding 132 by 4 slot pitches in the first direction, or may be formed to be spaced apart from the first phase winding 131 by 8 slot pitches in the first direction. The third phase winding 133 may be provided with a first partial W-phase winding 133a and a second partial W-phase winding 133b. Each of the first partial W-phase winding 133a and the second partial W-phase winding 133b may be provided with 1$^{st}$ to 64$^{th}$ conductors (1W~64W) spaced apart from each other by 6 slot pitches and connected to each other in series.

Each of the first partial W-phase winding 133a and the second partial W-phase winding 133b may include a first unit pattern 137a having the first conductor (1W) and having 2nd to 32nd conductors (2W~32W) spaced apart from the first conductor (1W) in the first direction, the 2nd to 32nd conductors (2W~32W) being arranged to have a layer difference by 1, and a second unit pattern 137b having 33$^{rd}$ conductor (33W) connected to the first unit pattern 137a in series and having 34$^{th}$ to 64$^{th}$ conductors (34W~64W) spaced apart from the 33$^{rd}$ conductor (33W) by 6 slot pitches in the second direction, the 34$^{th}$ to 64$^{th}$ conductors (34W~64W) being arranged to have a layer difference by one.

As shown in FIGS. 17 and 18, the first conductor (1W) of the first partial W-phase winding 133a may be arranged in the 8$^{th}$ layer 151h of the 9$^{th}$ slot. The first conductor (1W) of the second partial W-phase winding 133b may be spaced apart from the first conductor (1W) of the first partial W-phase winding 133a by one slot pitch in the first direction, and may be arranged in the 8$^{th}$ layer 151h of 10$^{th}$ slot.

The 2nd to 32nd conductors (2W~32W) of the first partial W-phase winding 133a are spaced apart from the first conductor (1W) of the first partial W-phase winding 133a in the first direction, by 6 slot pitches, and are arranged in the 7$^{th}$ layer 151g of the 15$^{th}$ slot so as to have a layer difference by one. And the 32nd conductor (32W) may be arranged in the first layer 151a of the 3$^{rd}$ slot.

The 33$^{rd}$ conductor (33W), which is the first conductor of the second unit pattern 137b of the first partial W-phase winding 133a, connected to the 32nd conductor (32W) of the first partial W-phase winding 133a, may be arranged in the first layer 151a of the 9$^{th}$ slot.

The 32nd and 33$^{rd}$ conductors (32W, 33W) of the first partial W-phase winding 133a may be connected to each other in series by the bridge conductor 210, and may be integrally coupled to each other by welding.

The 34$^{th}$ to 64$^{th}$ conductors (34W~64W) of the second unit pattern 137b of the first partial W-phase winding 133a are spaced apart from the 33$^{rd}$ conductor (33W) by 6 slot pitches in the second direction, and are arranged so as to have a layer difference by one and then are connected to each other in series. And the 64$^{th}$ conductor (64W) may be arranged in the 8$^{th}$ layer 151h of the 15$^{th}$ slot spaced apart from the first conductor (1W) by 6 slot pitches in the first direction.

The 64$^{th}$ conductor (64W), the last conductor of the second unit pattern 137b of the second partial W-phase winding 133b may be arranged in the 8$^{th}$ layer 151h of the 16$^{th}$ slot.

FIG. 19 illustrates an example state of the first conductors (1U, 1V, 1W) to the 64$^{th}$ conductors (64U, 64V, 64W) of the first partial U-phase winding 131a, the second partial U-phase winding 131b, the first partial V-phase winding 132a, the second partial V-phase winding 132b, the first partial W-phase winding 133a and the second partial W-phase winding 133b, which are inserted into slots of the stator.

Referring to FIG. 2, for instance, each of the first conductors (1U, 1V, 1W) of the first partial U-phase winding 131a, the second partial U-phase winding 131b, the first partial V-phase winding 132a, the second partial V-phase winding 132b, the first partial W-phase winding 133a and the second partial W-phase winding 133b may be provided with a horizontal bent section 145a bent so as to be extended outward in a radial direction of the stator core 110 and arranged horizontally, and a vertical bent section 145b bent from the horizontal bent section 145a and arranged in an axial direction.

The vertical bent section 145b of each of the first conductors (1U,1V,1VV) may be arranged at an inner side than an outer periphery (edge) of the stator core 110 in the radial direction of the stator core 110.

In some examples, the size of the stator may be prevented from being increased in the radial direction by connecting the power line 160.

Figure 20:
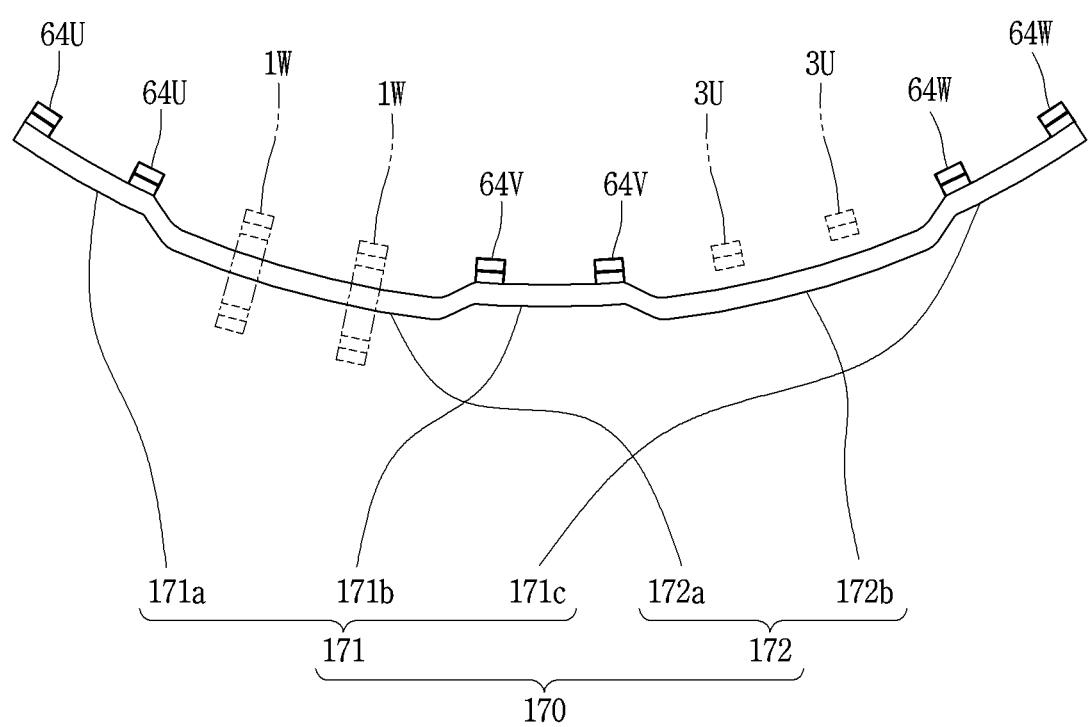
FIG. 20 is a planar view showing an example connection relation of an example neutral line shown in FIG. 2.

FIG. 20 is a planar view showing a connection relation of a neutral line shown in FIG. 2.

As shown in FIG. 20, the 64$^{th}$ conductors (64U, 64V, 64W), the last conductors of the first partial U-phase winding 131a, the second partial U-phase winding 131b, the first partial V-phase winding 132a, the second partial V-phase winding 132b, the first partial W-phase winding 133a and the second partial W-phase winding 133b may be connected to the neutral line 170 so as to allow electrical conduction.

For instance, the neutral line 170 may include three conductor contact portions 171a, 171b, 171c which contact the last conductors (64U, 64V, 64W) of the first phase winding 131, the second phase winding 132 and the third phase winding 133, and two crossover portions 172a,172b for connecting two neighboring conductor contact portions with each other.

Each of the conductor contact portions 171a, 171b, 171c may be formed to have a length long enough to simultaneously contact two last conductors of each partial phase winding, the two last conductors being spaced apart from each other by one slot pitch.

Each of the two crossover portions 172a, 172b may be formed to have a length long enough to connect two conductor contact portions between first conductors spaced apart from each other by 4 slot pitches, with each other.

The two crossover portions 172a, 172b may be bent outward in the radial direction of the stator core 110, in a spaced manner from each other, so as to be prevented from contacting a conductor arranged between the last conductors of each partial phase winding.

In some implementations, each conductor segment 140 may be inserted into each slot 116 of the stator core 110, and the extension portions 145 of the conductor segment 140 may be twisted in a preset direction and may be bent so as to be inclined from the insertion portions 141.

The bent end portions 146 of the extension portions 145 of the conductor segment 140 may be welded to form the unit patterns, thereby forming the first partial U-phase winding 131a, the second partial U-phase winding 131b, the first partial V-phase winding 132a, the second partial V-phase winding 132b, the first partial W-phase winding 133a and the second partial W-phase winding 133b.

The neutral line 170 may be coupled to the 64$^{th}$ conductors (64U, 64V, 64W) of the first partial U-phase winding 131a, the second partial U-phase winding 131b, the first partial V-phase winding 132a, the second partial V-phase winding 132b, the first partial W-phase winding 133a and the second partial W-phase winding 133b, by welding.

The welding portion 149 and the neutral line 170 of each conductor segment 140 may be coated with an insulating material (e.g., epoxy resin).

In some examples, a coupling region between the welding portion 149 and the neutral line 170 may have an enhanced insulation performance.

First conductors (1U, 1V, 1W) of the first partial U-phase winding 131a, the second partial U-phase winding 131b, the first partial V-phase winding 132a, the second partial V-phase winding 132b, the first partial W-phase winding 133a and the second partial W-phase winding 133b may be bent such that the horizontal bent section 145a and the vertical bent section 145b are formed.

The first conductors (1U) of the first partial U-phase winding 131a and the second partial U-phase winding 131b may be connected to a U-phase power line 161 among the power lines 160. The first conductors (1V) of the first partial V-phase winding 132a and the second partial V-phase winding 132b may be connected to a V-phase power line 162 among the power lines 160. And the first conductors (1W) of the first partial W-phase winding 133a and the second partial W-phase winding 133b may be connected to a W-phase power line 163 among the power lines 160 in parallel.

As aforementioned, the first conductors connected to the power lines of a plurality of phase windings of the stator coil are arranged in the outermost layer of slots, and the conductors connected to each other by the bridge conductors of the plurality of phase windings are arranged in the first layer. Accordingly, a connection ring may be not required, the number of components may be reduced, and the fabrication costs may be reduced.

Further, since the conductors connected to the power lines are arranged in the outermost layer of slots, and the conductors connected to the bridge conductors are arranged in the first layer, interference with peripheral conductors may be reduced when the bridge conductors are connected, thereby facilitating a connection operation of the bridge conductors.

Further, the stator coil is provided with a plurality of unit patterns connected to each other in series. The plurality of unit patterns include a first unit pattern connected to each other with 6 slot pitches in the first direction such that its layer number is increased or decreased, and a second unit pattern connected to each other with 6 slot pitches in the second direction opposite to the first direction such that its layer number is increased or decreased. Accordingly, types of conductors inserted into slots of the stator core may be simplified, and the number of welding regions may be reduced.

Further, each conductor segment of the stator coil is arranged such that its layer number is increased or decreased by one in the first or second direction, and the conductor segments are connected to each other in series. This may simplify types and reduce the number of jump lines.

Further, the stator coil is provided with a plurality of phase windings, and each of the plurality of phase windings is provided with conductors formed as a 2-line integrated type. This may reduce an alternating current resistance at a high speed driving region, thereby enhancing an output density.

The bridge conductor includes conductor contact portions which contact conductors, horizontal bent portions horizontally curvedly-extended from the conductor contact portions, vertical bent portions vertically curvedly-extended from the horizontal bent portion, and a crossover portion for connecting the vertical bent portions with each other. The horizontal bent portion has its length controlled. This may restrict interference between the bridge conductors, thereby facilitating a connection operation among the bridge conductors and enhancing an insulation performance.

As the present features may be implemented in several forms without departing from the characteristics thereof, it should also be understood that the above-described implementations are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A stator for a rotary electric machine, the stator comprising:
    a stator core defining a plurality of slots; and
    a stator coil including a plurality of phase windings each of which is connected to a corresponding phase of a power source,
    wherein each of the plurality of phase windings includes:
        a plurality of conductors numbered from $1^{st}$ to Nth conductors and inserted into the plurality of slots, each of the plurality of conductors being connected to an adjacent conductor in series and spaced apart from the adjacent conductor by a first pitch spanning a portion of the plurality of slots,
        a plurality of unit patterns each of which comprises a portion of the plurality of conductors, and
        a bridge conductor that connects the plurality of unit patterns to each other in series by connecting a pair of conductors among the plurality of conductors, the pair of conductors being arranged in an innermost layer of corresponding slots,
    wherein each $1^{st}$ conductor of the plurality of conductors of each phase winding is connected to a power line and arranged in an outermost layer of one of the plurality of slots,
    wherein each Nth conductor is connected to a neutral line, arranged in the outermost layer, and spaced apart from the $1^{st}$ conductor by the first pitch,
    wherein the plurality of unit patterns include:
        a first unit pattern including a first portion of the plurality of conductors that includes the $1^{st}$ conductor, each conductor of the first portion being connected to an adjacent conductor among the first portion and spaced apart from the adjacent conductor by the first pitch in a first direction along a circumferential direction of the stator core, and
        a second unit pattern including a second portion of the plurality of conductors that includes the Nth conductor, each conductor of the second portion being connected to an adjacent conductor among the second portion and spaced apart from the adjacent conductor by the first pitch in a second direction opposite the first direction, and
    wherein the bridge conductor connects a last conductor of the first unit pattern and a first conductor of the second unit pattern that are arranged in the innermost layer and spaced apart by the first pitch.

2. The stator of claim 1, wherein the first unit pattern includes m−1 conductors that are connected in series in the first direction and numbered from the $1^{st}$ conductor to an (m−1)th conductor, wherein odd-numbered conductors of the first unit pattern are arranged at layers that are located outer by one layer than an adjacent even-numbered conductor of the first unit pattern, wherein the second unit pattern includes N−(m−1) conductors that are connected in series in the second direction and numbered from an mth conductor to the Nth conductor, and wherein even-numbered conductors of the second unit pattern are arranged at layers located outer by one layer than adjacent odd-numbered conductors of the second unit pattern.

3. The stator of claim 2, wherein the bridge conductor includes:
conductor contact portions that contact the (m−1)th conductor and the mth conductor, respectively;
horizontal bent portions extending from the conductor contact portions in a first curved direction;
vertical bent portions extending from the horizontal bent portions in a second curved direction; and
a crossover portion that connects the vertical bent portions to each other.

4. The stator of claim 3, wherein the (m−1)th conductor and the mth conductor protrude in an axial direction of the stator core farther than end parts of other conductors of the first and second unit patterns, and
wherein each of the horizontal bent portions is spaced apart from a welding portion located at end parts of the other conductors by a preset interval.

5. The stator of claim 1, wherein the stator core includes sheets of metal laminated in a lamination direction, and
wherein the $1^{st}$ conductor protrudes in the lamination direction of the stator core.

6. The stator of claim 1, wherein each of the plurality of phase windings includes a first partial phase winding and a second partial phase winding that are connected to each other in parallel.

7. The stator of claim 1, wherein the plurality of phase windings include a first phase winding, a second phase winding, and a third phase winding,
wherein the second phase winding is spaced apart from the first phase winding in the first direction by a second pitch less than the first pitch, and
wherein the third phase winding is spaced apart from the second phase winding by the second pitch in the first direction.

8. The stator of claim 7, wherein the neutral line includes:
three conductor contact portions that are connected to the Nth conductor of the first, second, and third phase windings, respectively, and
two crossover portions that connect adjacent conductor contact portions of the three conductor contact portions.

9. The stator of claim 8, wherein the conductor contact portions contact an outer surface of the Nth conductors,
wherein the conductor contact portions and the Nth conductors are welded to each other in a radial direction of the stator core,
wherein the crossover portions protrude outward from the conductor contact portions in the radial direction of the stator core, and
wherein the conductor contact portions and the crossover portions are arranged at an inner side of an outer periphery of the stator core.

10. The stator of claim 7, wherein the plurality of slots includes 48 slots numbered from $1^{st}$ to $48^{th}$ slots,
wherein each of the 48 slots includes 8 layers from $1^{st}$ to $8^{th}$ layers,
wherein the first pitch spans 6 consecutive slots of the plurality of slots, and
wherein the second pitch spans 4 consecutive slots of the plurality of slots.

11. The stator of claim 10, wherein the first unit pattern of the first phase winding includes first 32 conductors connected in series from $1^{st}$ to $32^{nd}$ conductors in the first direction,
wherein the first 32 conductors are arranged in a manner in which the $1^{st}$ conductor of the first unit pattern is provided in the $8^{th}$ layer of the $1^{st}$ slot, the $2^{nd}$ conductor of the first unit pattern is provided in the $7^{th}$ layer of the $7^{th}$ slot, and the $3^{rd}$ conductor is provided in the $8^{th}$ layer of the $13^{th}$ slot, and the $32^{nd}$ conductor is provided in the $1^{st}$ layer of the $43^{rd}$ slot,
wherein the second unit pattern of the first phase winding includes second 32 conductors connected in series from $33^{rd}$ to $64^{th}$ conductors in the second direction, and
wherein the second 32 conductors are arranged in a manner in which the $33^{rd}$ conductor of the second unit pattern is provided in the $1^{st}$ layer of the $1^{st}$ slot, the $34^{th}$ conductor is arranged in the $2^{nd}$ layer of the $43^{rd}$ slot, and the $64^{th}$ conductor is provided in the $8^{th}$ layer of the $7^{th}$ slot.

12. The stator of claim 11, wherein the bridge conductor connects the $32^{nd}$ conductor and the $33^{rd}$ conductor.

13. The stator of claim 1, wherein each of the plurality of conductors is a 2-line integrated type conductor that includes a pair of conductor segments, and
wherein the pair of conductor segments have a same shape and size and are fold to overlap each other.

14. The stator of claim 1, further comprising a plurality of insulation members that are inserted into the plurality of slots and that insulate the stator core from the plurality of conductors.

15. The stator of claim 1, wherein each of the plurality of conductors includes a conductor segment that includes:
a first insertion portion extending in an axial direction of the stator core and being configured to insert into a first slot of the plurality of slots;
a second insertion portion extending in the axial direction and being configured to insert into a second slot spaced apart from the first slot by the first pitch; and
a pair of crossover portions that extend from first ends of the first and second insertion portions and that are connected to each other.

16. The stator of claim 15, wherein the conductor segment further includes a bent portion that connects the pair of crossover portions and that is bent in a thickness direction of the conductor segment to allow the first and second insertion portions to insert into different layers arranged in a radial direction of the stator core in different slots.

17. The stator of claim 16, wherein the conductor segment further includes a pair of extension portions that extend from second ends of the first and second insertion portions, and
wherein each of the pair of extension portions is bent toward a first direction along a circumferential direction of the stator core or a second direction opposite the first direction.

18. The stator of claim 17, wherein the conductor segment includes an insulation layer that insulates the plurality of conductors from each other.

19. The stator of claim 18, wherein the pair of extension portions include bent end parts that extend in the axial direction and have a cut-out portion without the insulation layer, and wherein the conductor segment is configured to be electrically connected to another conductor segment through the cut-out portion.

20. The stator of claim 1, wherein the plurality of slots are spaced part from one another by one slot pitch, and the first pitch corresponds to six slot pitches.

* * * * *